(12) United States Patent
Roberts et al.

(10) Patent No.: US 8,564,205 B2
(45) Date of Patent: Oct. 22, 2013

(54) CONFIGURABLE VEHICLE SOLID STATE LIGHTING

(75) Inventors: Bruce R Roberts, Mentor-on-the-Lake, OH (US); Agoston Boroczki, Budapest (HU)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 13/113,321

(22) Filed: May 23, 2011

(65) Prior Publication Data
US 2012/0299476 A1 Nov. 29, 2012

(51) Int. Cl.
*H05B 37/02* (2006.01)
*B60Q 1/02* (2006.01)

(52) U.S. Cl.
USPC ............... 315/82; 315/77; 315/294; 362/545

(58) Field of Classification Search
USPC .............................. 315/77, 82, 291, 294, 297; 362/540–545
See application file for complete search history.

(56) References Cited

U.S. PATENT DOCUMENTS

| | | |
|---|---|---|
| 2,301,583 A | 11/1942 | Rodrick |
| 5,184,883 A | 2/1993 | Finch |
| 5,803,579 A | 9/1998 | Turnbull et al. |
| 5,924,784 A | 7/1999 | Chliwnyj et al. |
| 5,975,728 A | 11/1999 | Weyer |
| 6,016,038 A | 1/2000 | Mueller et al. |
| 6,025,775 A | 2/2000 | Erlandson |
| 6,520,669 B1 | 2/2003 | Chen et al. |
| 6,714,128 B2 | 3/2004 | Abbe et al. |
| 6,717,376 B2 * | 4/2004 | Lys et al. ............ 315/292 |
| 6,870,474 B1 | 3/2005 | Brothers |
| 7,155,329 B2 | 12/2006 | Mepham et al. |
| 7,478,492 B2 | 1/2009 | Madonia |
| 7,888,881 B2 * | 2/2011 | Shteynberg et al. ........ 315/291 |

(Continued)

FOREIGN PATENT DOCUMENTS

| | | |
|---|---|---|
| DE | 3916875 A1 | 12/1990 |
| DE | 10011843 A1 | 9/2001 |

(Continued)

OTHER PUBLICATIONS

Partial Search Report from corresponding International Patent Application No. PCT/US2012/038738, dated Aug. 27, 2012.

(Continued)

*Primary Examiner* — Don Le
(74) *Attorney, Agent, or Firm* — Fay Sharpe LLP

(57) ABSTRACT

A vehicle signal light assembly includes: at least one color mixing light source; a support element configured to support the at least one color mixing light source on a vehicle as a signal light; and a controller configured to selectively drive each color mixing light source to generate light of a selected visually perceived color based on a received control signal. In some such embodiments, each color mixing light source of the vehicle signal light assembly comprises a plurality of light emitting diodes (LEDs) of at least two constituent colors. In some such embodiments, the controller is configured to operate each color mixing light source of the vehicle signal light assembly using time domain multiplexing (TDM) to generate the light of the selected visually perceived color. In some such embodiments, the vehicle signal light assembly comprises a taillight assembly. In some of the embodiments, the vehicle light assembly comprises an ambient or auxiliary lighting, or a dashboard lighting assembly.

28 Claims, 11 Drawing Sheets

(56) References Cited

U.S. PATENT DOCUMENTS

| | | | |
|---|---|---|---|
| 8,077,023 B2 * | 12/2011 | King et al. | 340/431 |
| 2002/0085377 A1 | 7/2002 | Mukogawa | |
| 2005/0063194 A1 | 3/2005 | Lys et al. | |
| 2005/0254240 A1 | 11/2005 | Lawrence et al. | |
| 2008/0055896 A1 | 3/2008 | Feldmeier | |
| 2008/0130303 A1 | 6/2008 | Medina et al. | |
| 2010/0066255 A1 | 3/2010 | Roberts | |

FOREIGN PATENT DOCUMENTS

| | | |
|---|---|---|
| DE | 10043660 A1 | 3/2002 |
| EP | 1338469 A2 | 8/2003 |
| EP | 2295849 A1 | 3/2011 |
| GB | 2139340 A | 11/1984 |
| JP | 200519155 A | 1/2005 |
| WO | 9906760 A1 | 2/1999 |
| WO | WO 99/10867 | 3/1999 |
| WO | 2010030462 A1 | 3/2010 |

OTHER PUBLICATIONS

Search Report from corresponding PCT Application No. PCT/US2012/038738, dated Nov. 28, 2012.

* cited by examiner

CONFIGURABLE VEHICLE SOLID STATE LIGHTING

BACKGROUND

The following relates to the illumination arts, lighting arts, and related arts.

Automotive indicator lighting must conform with applicable regulatory- and safety-related constraints, while also remaining cost-effective. In the highly competitive automotive market, a savings of a small fraction of a dollar per unit can translate into substantial cost savings. Additionally, automotive indicator lighting is an integral part of the overall design of the automobile, and accordingly should have an appealing appearance.

In the United States, automotive indicator lighting includes left and right taillight assemblies, as well as various optional or mandatory side and front signal light assemblies. Each taillight assembly includes a taillight that illuminates in red whenever the automobile headlights are on to enhance rear visibility of the vehicle. Each taillight assembly also includes a brake light that illuminates a brighter red (as compared with the taillight) to indicate application of the brakes, so as to warn following drivers of the vehicle braking operation. The brake light can be implemented either as a separate light or multi-filament assembly, or can be the same as the taillight but operated at a higher intensity. Still further, each taillight assembly includes a backup light, which must be white. Finally, each taillight assembly must include a turn signal light, which can be either red or yellow, but in either case must flash on and off. The basic requirements in Europe are similar, except that in Europe yellow turn indicator lights are mandatory.

The various signal components of the taillight assembly must be independently operable in order to simultaneously inform other road users of simultaneous vehicle conditions or events. For example, it may be that the automobile is backing up while simultaneously braking and turning. In such a case, the brake light must be on, the turn indicator light must be on, and the white backup light must be on, all simultaneously. Accordingly, the taillight assembly typically includes either three lights (in designs utilizing a combined taillight/brake light) or four lights (in designs utilizing a separate taillight and brake light).

The "red", "white", and "yellow" (sometimes also referred to as "amber") colors are typically constrained by applicable regional regulations that specify more precisely the shade or hue or equivalent information for each indicator light color. These applicable regulations may be different in different geographical regions. As a result, an automobile that is "street legal" in Europe may fail to meet regulatory standards in the United States, or vice versa. These regulatory differences have spawned a lucrative market for high end automobile importers, which charge substantial fees for retrofitting the indicator lighting and other features of an imported automobile to comply with road regulations of the receiving country.

Even in the absence of regulatory constraints, the automobile manufacturer may wish to adapt the colors of the indicator lights to specific markets. For example, anecdotal evidence in the lighting industry suggests that in some countries illumination lamps that output a "cool white" light sell better than lamps producing "warm white" light; whereas, in the other countries lamps producing warm white light tend to outsell those producing cool white light. Similar local preferences may exist for automotive indicator lighting, influenced by factors such as "average" local visibility (typically high in a dry desert climate but lower in higher-humidity climates), the extent of artificial roadway lighting infrastructure, or so forth.

For vehicle manufacturers operating in a global marketplace, regional differences in regulatory standards and/or customer preferences complicate manufacturing and increase costs, as the manufacturer must employ different indicator light assemblies for automobiles intended for sale in various different geographical markets. This in turn means maintaining different stock keeping unit (SKU) lines for different regional taillight variations, which increases inventory, requires parallel supply lines for the different SKU lines, and restricts vehicle manufacturing and delivery flexibility.

Existing automobile indicator lights have additional deficiencies. For example, in spite of their complexity, the actual informational content provided by existing taillight assemblies is rather limited. A following driver is warned of braking by activation of the brake light, but is given no indication of whether the vehicle ahead is slowing down gently, or engaging in a panic stop. Indeed, existing commercial taillight assemblies provide no information about speed changes other than braking. Proposals exist to indicate "hard" braking by a mechanism such as blinking red brake lights, or blinking both amber turn indicators (if amber lights are used for the turn indicators). The former approach (blinking red brake lights) has the disadvantage that it could be confused with a slow braking event in which the driver taps the brake pedal several times (thus producing a "blinking" of the brake light).

One way to provide additional information is via light intensity changes. A change in the red light intensity is already used to indicate braking when the taillights are on. However, employing light intensity changes to convey additional information to other road users is problematic. One difficulty is that the visually perceived light intensity depends upon numerous factors besides the actual radiation output. These include: the intensity and source position of ambient lighting; atmospheric conditions; visual acuity of the perceiving road user; whether the perceiving road user is viewing directly or through a windshield or windscreen, and if the latter the transmissivity of the windshield or windscreen; the angle and distance from which the road user views the indicator light; and so forth. Using light intensity to convey analog information (such as how strongly the brakes are being applied, or the vehicle speed or acceleration rate) is therefore problematic, because it is difficult for other road users to gauge the absolute light intensity. Another problem with using variable light intensity to convey information is that the lowest end of the light intensity range may be visually imperceptible for some viewers.

Flashing a light on and off can also be used to provide information, as in a flashing turn indicator. Again, however, number of different kinds of information that can be intuitively conveyed by the flashing of lights is limited.

Another possible way to provide additional information is to provide additional indicator lights of different colors. For example, the inclusion of a rearward-facing green light to indicate acceleration was proposed at least as far back as the early 1940's (see Rodrick, U.S. Pat. No. 2,301,583). A green acceleration indicator light has not yet been adopted by any substantial geographical region, and some jurisdictions prohibit the use of colors other than red (and perhaps amber for turn signaling or white to indicate backup) in rearward facing vehicle signal lights. Thus, the adoption of green (or other "nonstandard" colors) is likely to occur, if at all, on a limited geographical basis.

The adoption of "new" signal lights, such as a green acceleration light, into existing vehicle signal lighting schemes is hindered by numerous factors. Cost is one issue. A typical taillight assembly already typically includes at least three different indicator lights (red, yellow, and white). Adding lights of additional colors would further add to vehicle manufacturing cost. The use of new signal lights is also hindered by government regulations, which can be slow to change and are highly region-specific. A new signal light must be "street-legal" in substantial geographical area (such as the United States, Europe, or so forth) in order to justify mass manufacturing of vehicles with the new signal light.

A relatively recent development in vehicle signal lighting has been a gradual replacement of incandescent signal lamps with light emitting diode (LED)-based signal lamps. For example, a red tail or brake incandescent lamp can be replaced by a red LED-based lamp, which provides faster light run-up time, higher electrical energy efficiency, improved operational lifetime and robustness against failure, and may reduce manufacturing cost. However, replacement of an incandescent lamp with an LED lamp does not reduce the multiplicity of different taillight assembly SKU lines needed for different geographical regions, and does not facilitate the adoption of new signal lights.

LED-based lamps have also been used to enhance aesthetic automotive design, for example by integrating LED lamps of different colors on a common substrate (see, e.g. Lawrence et al., U.S. 2005/0254240), and using flexible substrates to design LED taillight assemblies that conform with vehicle curvature (Chen, et al., U.S. Pat. No. 6,520,669). The use of an LED signal lamp that can selectively emit one of two or more different colors has also been proposed, so as to reduce the number of signal lamps. For example, Abbe et al., U.S. Pat. No. 6,714,128 discloses a "smart light" that includes a set of red LEDs and a set of amber LEDs with a controller that selectively operates either the red LEDs or the amber LEDs so as to enable the "smart light" to be selectively used as either a red taillight or brake light or as an amber turn indicator. This amounts to a tight integration of red and amber LED-based lamps on a common substrate together with integral control electronics.

However, these developments still do not reduce the multiplicity of different taillight assembly SKU lines needed to accommodate the various different regional signal light standards. Indeed, by integrating red and amber LED lamps on a common substrate, the number of different SKU lines required to accommodate different regional regulations or preferences may increase, since a difference in any one signal lamp of the integral assembly of signal lamps will require a new SKU line. These developments also do not facilitate the adoption of new signal lights.

BRIEF SUMMARY

In some illustrative embodiments disclosed herein, a vehicle signal light assembly includes: at least one color mixing light source; a support element configured to support the at least one color mixing light source on a vehicle as a signal light; and a controller configured to selectively drive each color mixing light source to generate light of a selected visually perceived color based on a received control signal. In some such embodiments, each color mixing light source of the vehicle signal light assembly comprises a plurality of light emitting diodes (LEDs) of at least two constituent colors. In some such embodiments, the controller is configured to operate each color mixing light source of the vehicle signal light assembly using time domain multiplexing (TDM) to generate the light of the selected visually perceived color. In some such embodiments, the vehicle signal light assembly comprises a taillight assembly.

In some illustrative embodiments disclosed herein, an apparatus is disclosed, including a vehicle, and a vehicle signal light assembly as set forth in the immediately preceding paragraph, wherein the vehicle signal light assembly is supported by the support element on the vehicle and the controller is operatively connected with the vehicle to operate the vehicle signal light assembly based on a control signal received from the vehicle.

In some illustrative embodiments disclosed herein, a method is disclosed, comprising generating a vehicle signal emanating from a vehicle by: emitting signaling light of a first visually perceived color responsive to a first control signal using a color mixing light source mounted on the vehicle, the signaling light of the first visually perceived color comprising a mixture of light of at least two different colors generated by the color mixing light source; and emitting signaling light of a second visually perceived color responsive to a second control signal using the color mixing light source mounted on the vehicle, the second visually perceived color being different from the first visually perceived color.

In some illustrative embodiments disclosed herein, a taillight assembly is disclosed, the taillight including a color mixing light source and a controller configured to drive the color mixing light source to generate light of a selected one of at least two different selectable visually perceived colors based on a control signal received by the taillight assembly from the vehicle. In some such embodiments, the controller is configured to drive the color mixing light source to generate light of a selected one of at least two different selectable visually perceived colors using time-domain multiplexing (TDM) mixing of light of at least two different constituent colors.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF PREFERRED EMBODIMENTS

Figure 1:
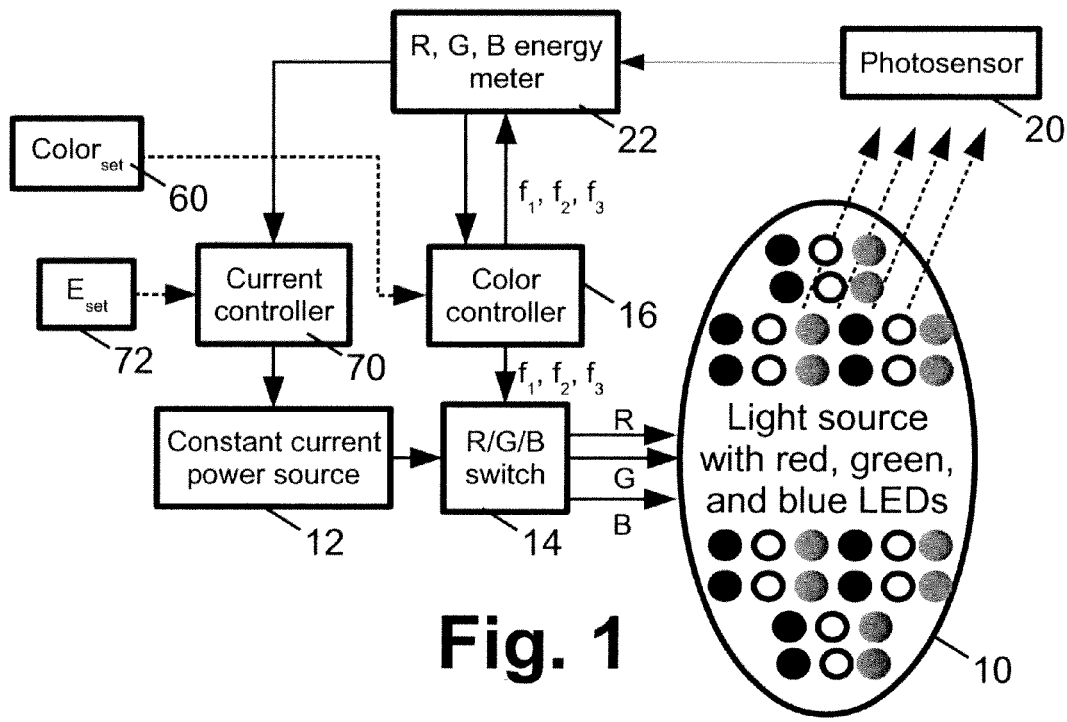
FIG. 1 diagrammatically illustrates an illumination system.

The term "light emitting diode" or "LED" as used herein denotes a compact solid-state light emitting device, and encompasses semiconductor-based LEDs (optionally including integral phosphor), organic LEDs (sometimes represented in the art by the acronym OLED), semiconductor laser diodes, or so forth. The terms "light emitting diode" or "LED" as used herein does not encompass incandescent light bulbs, fluorescent light tubes, halogen bulbs, high intensity or discharge (HID) lamps that incorporate an evacuated volume or a fluid (that is, gaseous or liquid) component.

The phrase "color LED" denotes an LED that emits light of the specified color. For example, a red LED emits red light; a white LED emits white light ("color" as used herein is to be broadly construed as encompassing white); a green LED emits green light; and so forth. In some instances a color LED may not appear visually to have the specified color when not operational—for example, some red LEDs do not appear visually as red objects when not operational. A "white LED" may in some embodiments comprise a semiconductor chip emitting ultraviolet or violet light coated with a white-fluorescing phosphor, such that the combination emits white light. In other embodiments, a "white LED" may comprise three semiconductor chips arranged in close proximity that emit red, blue, and green light, respectively, and are electrically interconnected and mounted as a single device package emitting white light. Also, note that the terms "yellow" and "amber" are used interchangeably herein.

The vehicle indicator lights disclosed herein utilize color mixing light sources. A color mixing light source, as that term is used herein, encompasses a light source that includes a plurality of interspersed pluralities of light emitting diodes (LEDs) including at least a first plurality of LEDs emitting light of a first color and an interspersed second plurality of LEDs emitting light of a second color different from the first color. For example, in some embodiments the first plurality of LEDs may emit red light and the second plurality of LEDs may emit yellow or amber light. In some other embodiments, the first plurality of LEDs may emit red light, the second plurality of LEDs may emit green light, and a third plurality of LEDs may emit blue light. The LEDs of the color mixing light source are arranged in an interspersed fashion so that light from the various pluralities of LEDs mix together when illuminated. The color mixing light source optionally also includes a lens, reflector, light guide, or other optics or combination of optics for mixing, collimating, diverging, or otherwise shaping or adjusting the light. If the pluralities of LEDs emit red, green, and blue light, then the mixture can in the proper proportions correspond to white light. As used herein, "white light" is considered a color of light. In one suitable arrangement, the LEDs include red, green, and blue LEDs.

Two or more pluralities of LEDs of the color mixing light source can generate mixed light that is a combination of the source colors (additive color mixing). The term "visually perceived light" is used to denote the light visually observed to be output by the color mixing light source. Color mixing light sources can employ various color mixing schemes, such as pulse-width modulation (PWM), pulse frequency modulation (PFM), pulse amplitude modulation (PAM), continuous d.c. or a.c. control, and so forth. For example, Chliwnyj et al., U.S. Pat. No. 5,924,784 discloses a color mixing light source comprising independent microprocessor-based PWM control of two or more different color LEDs to generate light simulating a flame. Such PWM control is well known, and commercial PWM controllers are available for driving LEDs using PWM. See, e.g., Motorola Semiconductor Technical Data Sheet for MC68HC05D9 8-bit microcomputer with PWM outputs and LED drive (Motorola Ltd., 1990). In PWM, a train of pulses is applied at a fixed frequency, and the pulse width (that is, the time duration of the pulse) is modulated to control the time-integrated power applied to the LED. Accordingly, the time-integrated applied power is directly proportional to the pulse width, which can range between 0% duty cycle (no power applied) to 100% duty cycle (power applied during the entire period). In PFM, the pulse width is fixed and the repetition rate of pulses is varied to control the time-integrated power applied to the LED. In PAM, both the pulse duration and repetition frequency are fixed, and the pulse amplitude is varied to control the time-integrated power applied to the LED.

As used herein, the term "color mixing light source" can employ any color mixing scheme, including but not limited to PWM, PFM, PAM, continuous d.c. or a.c. control.

Another aspect of a color mixing light source as that term is used herein is that the color of light output by the color mixing light source can be changed or adjusted by changing the relative intensities of the constituent interspersed pluralities of LEDs. Thus, a white light source that merely uses interspersed red, green, and blue LEDs to generate white light, without a controller for adjusting the relative ratios of the red, green, and blue intensities to achieve color changing or color adjustment, is not a color mixing light source as that term is used herein.

With reference to FIGS. 1-8, an illustrative color mixing scheme employing time-domain multiplexing (TDM) is described. In the disclosed TDM approach, the pulse width for each color channel is varied (as in PWM), but the start time of each pulse for each channel is also adjusted such that only one channel is operational at any given time. Thus, the different colors are generated sequentially in TDM, but at a switching rate fast enough so that the eye "mixes" the colors to generate the visually perceived light as a time-integrated mixture. As disclosed herein, the TDM scheme can enable constant power draw, thus facilitating energy efficiency and reducing stress on the power source due to load changes.

With reference to FIG. 1, an illustrative color mixing light source 10 includes red, green, and blue light emitting diodes (LEDs). The red LEDs are electrically interconnected (circuitry not shown) to be driven by a red input line R. The green LEDs are electrically interconnected (circuitry not shown) to be driven by a green input line G. The blue LEDs are electrically interconnected (circuitry not shown) to be driven by a blue input line B. The light source 10 is an illustrative example; in general the light source can be any multi-color light source having sets of solid state light sources electrically interconnected to define different color channels. In some embodiments, for example, the red, green, and blue LEDs are arranged as red, green, and blue LED strings. Moreover, the different colors can be other than red, green, and blue, and there can be more or fewer than three different color channels. For example, in some embodiments a blue channel and a yellow channel are provided, which enables generation of various different colors that span a color range less than that of a full-color RGB light source, but including a "whitish" color achievable by suitable blending of the blue and yellow channels. The individual LEDs are diagrammatically shown as black, gray, and white dots in the light source 10 of FIG. 1.

The light source 10 is driven by a constant current power source 12. By "constant current" it is meant that the power source 12 outputs a constant rms root-mean-square) current. In some embodiments the constant rms current is a constant d.c. current. However, the constant rms current can be a sinusoidal current with a constant rms value, or so forth. The "constant current" is optionally adjustable, but it is to be understood that the current output by the constant current power source 12 is not cycled rapidly as is the case for PWM. The output of the constant current power source 12 is input to a R/G/B switch 14 which acts as a demultiplexor or one-to-three switch to channel the constant current into one, and only one, of the three color channels R, G, B at any given time.

Figure 2:
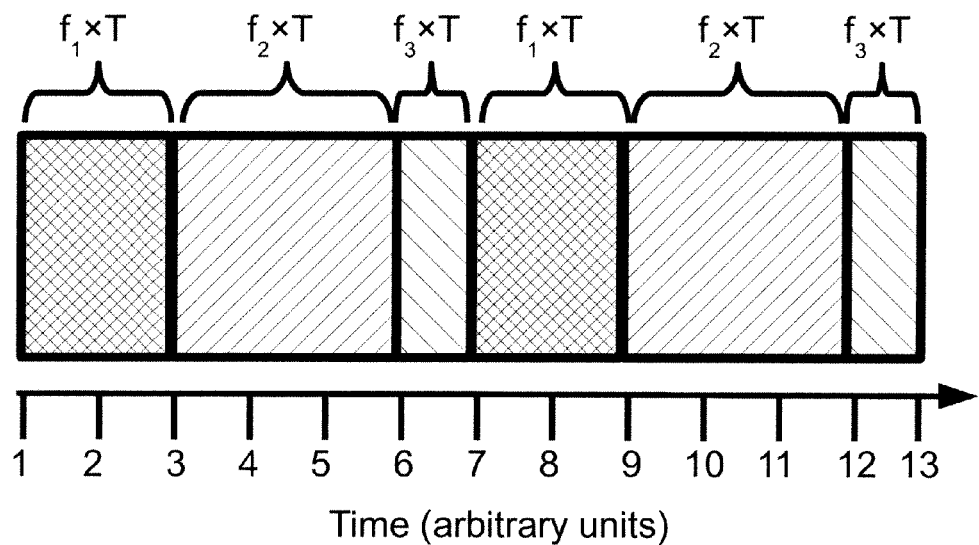
FIG. 2 diagrammatically illustrates a timing diagram for the R/G/B switch of the illumination system of FIG. 1.

The basic concept of the color control achieved using the constant current power source 12 and the R/G/B switch 14 is illustrated by a timing diagram shown in FIG. 2. The switching of the R/G/B switch 14 is performed over a time interval T, which is divided into three time sub-intervals defined by fractional periods $f_1 \times T$, $f_2 \times T$, and $f_3 \times T$ where $f_1+f_2+f_3=1$ and accordingly the three time periods obey the relationship $f_1 \times T + f_2 \times T + f_3 \times T = T$. A color controller 16 outputs a control signal indicating the fractional periods $f_1 \times T$, $f_2 \times T$, and $f_3 \times T$. For example, the color controller 16 may, in an illustrative embodiment, output a two-bit digital signal having value "00" indicating the fractional time period $f_1 \times T$, and switching to a value "01" to indicate the fractional time period $f_2 \times T$, and switching to a value "10" to indicate the fractional time period $f_3 \times T$, and switching back to "00" to indicate the next occurrence of the fractional time period $f_1 \times T$, and so on. In other embodiments, the control signal can be an analog control signal (e.g., 0 volts, 0.5 volts, and 1.0 volts indicating the first, second, and third fractional time periods, respectively) or can take another format. As yet another illustrative approach, the control signal can indicate transitions between fractional time periods, rather than holding a constant value indicative of each time period. In this latter approach, the R/G/B switch 14 is merely configured to switch from one channel to the next when it receives a control pulse, and the color controller 16 outputs a control pulse at each transition from one fractional time period to the next fractional time period.

During the first fractional time period $f_1 \times T$ the R/G/B switch 14 is set to flow the constant current from the constant current power source 12 into a first one of the color channels (for example, into the red channel R). As a result, the light source 10 generates only red light during the first fractional time period $f_1 \times T$. During the second fractional time period $f_2 \times T$ the R/G/B switch 14 is set to flow the constant current from the constant current power source 12 into a second one of the color channels (for example, into the green channel G). As a result, the light source 10 generates only green light during the second fractional time period $f_2 \times T$. During the third fractional time period $f_3 \times T$ the R/G/B switch 14 is set to flow the constant current from the constant current power source 12 into a third one of the color channels (for example, into the blue channel B). As a result, the light source 10 generates only blue light during the third fractional time period $f_3 \times T$. As indicated in FIG. 2, this cycle repeats with the time period T.

The time period T is selected to be shorter than the flicker fusion threshold, which is defined herein as the period below which the flickering caused by the light color switching becomes substantially visually imperceptible, such that the light is visually perceived as a substantially constant blended color. That is, T is selected to be short enough that the human eye blends the light output during the fractional time intervals $f_1 \times T$, $f_2 \times T$, and $f_3 \times T$ so that the human eye perceives a uniform blended color. Insofar as PWM also is based on the concept of visual blending of rapidly cycled light of different colors, the period T should be comparable to the pulse period used in PWM which is also below the flicker fusion threshold, for example below about 1/10 second, and preferably below about 1/24 second, and more preferably below about 1/30 second, or still shorter. A lower limit on the time period T is imposed by the switching speed of the R/G/B switch 14, which can be quite fast since its operation does not entail changing current levels (as is the case for PWM).

Quantitatively, the color can be computed as follows. The total energy of red light output by the red LEDs during the first fractional time interval $f_1 \times T$ is given by $a_1 \times f_1 \times T$; the total energy of green light output by the green LEDs during the second fractional time interval $f_2 \times T$ is given by $a_2 \times f_2 \times T$; and the total energy of blue light output by the blue LEDs during the third fractional time interval $f_3 \times T$ is given by $a_3 \times f_1 \times T$; where the constants $a_1$, $a_2$, $a_3$ are indicative of the relative efficiencies of the sets of red, green, and blue LEDs, respectively. For example, if for a given electrical current the light energy output by the set of red LEDs equals the light energy output by the set of green LEDs equals the light energy output by the set of blue LEDs, then a proportionality of $a_1:a_2:a_3$ is appropriate. On the other hand, if the set of blue LEDs outputs twice as much light for a given electrical current level as compared with the other sets of LEDs, then a proportionality of $2 \times a_1 : 2 \times a_2 : a_3$ is appropriate. Optionally, the constants $a_1$, $a_2$, $a_3$ represent the relative visually perceived brightness levels, rather than the relative photometric energy levels. The color is determined by the proportionality of the red, green, and blue light energy outputs, i.e. by the proportionality of $a_1 \times f_1 \times T : a_2 \times f_2 \times T : a_3 \times f_3 \times T$ or more simply $a_1 \times f_1 : a_2 \times f_2 : a_3 \times f_3$. For example, in illustrative FIG. 2 $f_1:f_2:f_3$ is 2:3:1 which (taking $a_1=a_2=a_3$ for simplicity) means that the relative ratio of red:green:blue is 2:3:1. If the fractional periods had proportionality $f_1:f_2:f_3=1:1:1$ then (again taking $a_1=a_2=a_3$ for simplicity) the light output would be visually perceived as an equal blending of red, green, and blue light, which is to say the light output would be white light.

Advantageously, the current output by the constant current power source 12 into the light source 10 remains the same at all times. In other words, from the viewpoint of the constant current power source 12, it is outputting a constant current to the load comprising the components 10, 14.

In some embodiments the switching between fractional time periods performed by the color controller 16 is done in an open-loop fashion, that is, without reliance upon optical feedback. In these embodiments, a look-up table, stored mathematical curves, or other stored information associates values of proportionality of the fractional ratios $f_1:f_2:f_3$ with various colors. For example, if $a_1=a_2:a_3$ then the values $f_1=f_2=f_3=1/3$ is suitably associated with the "color" white.

Figure 3:
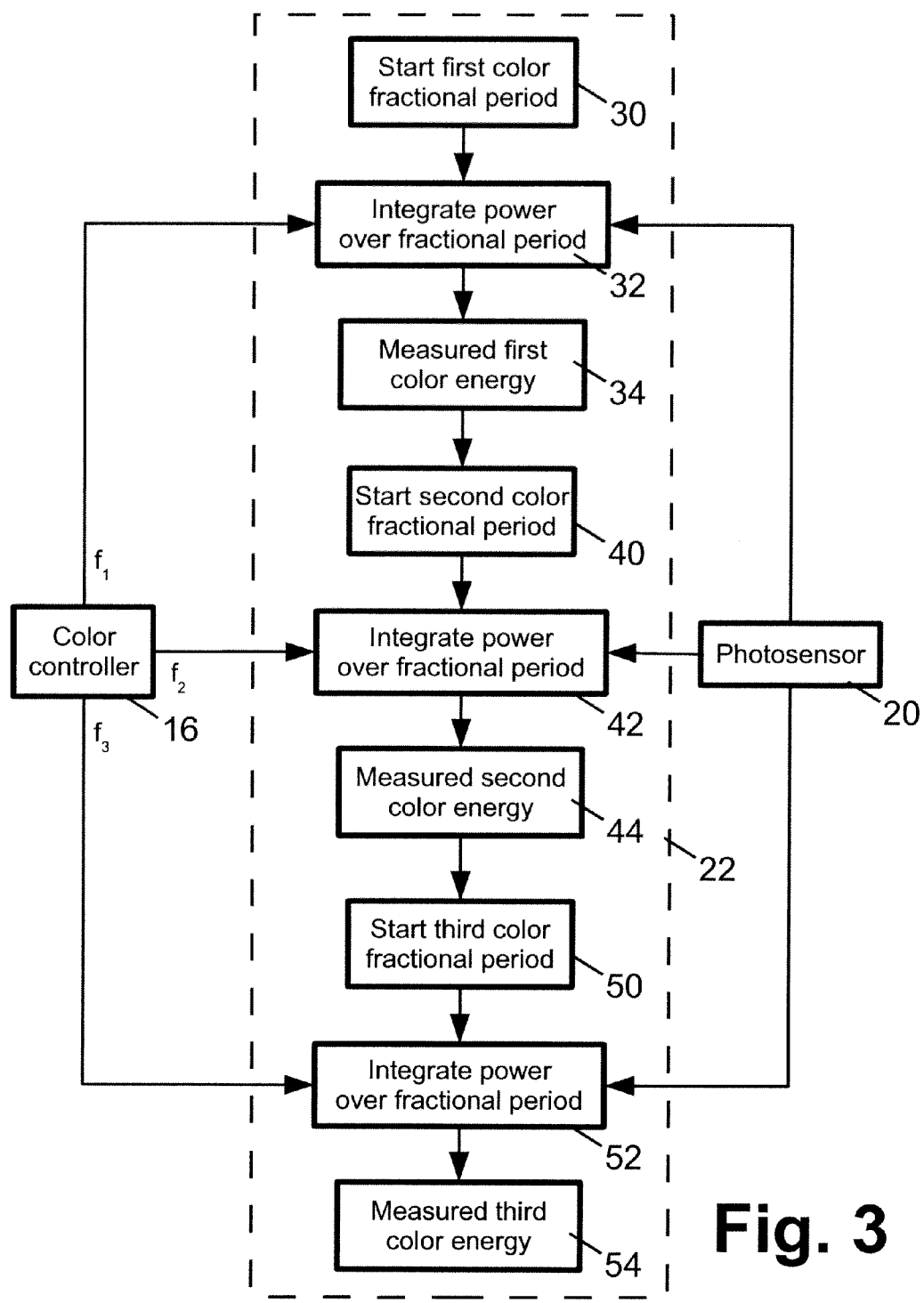
FIG. 3 diagrammatically illustrates the energy meter of the illumination system of FIG. 1.

With continuing reference to FIG. 1 and with further reference to FIGS. 3 and 4, in other embodiments the color is optionally controlled using optical feedback as follows. A photosensor 20 monitors the light power output by the light source 10. The photosensor 20 is of sufficiently broad wavelength to sense any of the red, green, or blue light. For simplicity, it is assumed herein that the photosensor 20 has equal sensitivity for red, green, and blue light—if this is not the case, it is straightforward to incorporate a suitable scaling factor to compensate for spectral sensitivity differences. FIG. 3 illustrates a suitable optical power measurement process performed by a R, G, B energy meter 22. At a start 30 of a first color fractional period (i.e., the start of the fractional period $f_1 \times T$), an optical power measurement is initiated. The measured optical power is integrated 32 over the first fractional period $f_1 \times T$ to generate a measured first color energy 34. Note that because only one set of LEDs of a single color (e.g., red) is operating during the first fractional period $f_1 \times T$, the broadband photosensor 20 measures only red light during the time interval of the integration 32. At a transition 40 to the second fractional time interval $f_2 \times T$, a second optical power integration 42 is initiated which extends over the second fractional time period $f_2 \times T$ in order to generate a measured second color energy 44. Again, because only one set of LEDs of a single color (e.g., green) is operating during the second fractional period $f_2 \times T$, the broadband photosensor 20 measures only green light during the time interval of the integration 42. At a transition 50 to the third fractional time interval $f_3 \times T$, a third optical power integration 52 is initiated which extends over the third fractional time period $f_3 \times T$ in order to generate a measured third color energy 54. Yet again, because only one set of LEDs of a single color (e.g., blue) is operating during the third fractional period $f_3 \times T$, the broadband photosensor 20 measures only blue light during the time interval of the integration 52.

Thus, it is seen that the single broadband photosensor 20 is capable of generating all three of the measured first color energy 34, the measured second color energy 44, and the measured third color energy 54. This is achieved because the control system 12, 14, 16 ensures that only a single set of LEDs of a single color are operational at any given time. In contrast, with existing PWM system two or more sets of LEDs of different colors may be operational at the same time, which then dictates that different narrowband photosensors centered on the different colors are used to simultaneously disambiguate and measure the light of the different colors.

Figure 4:
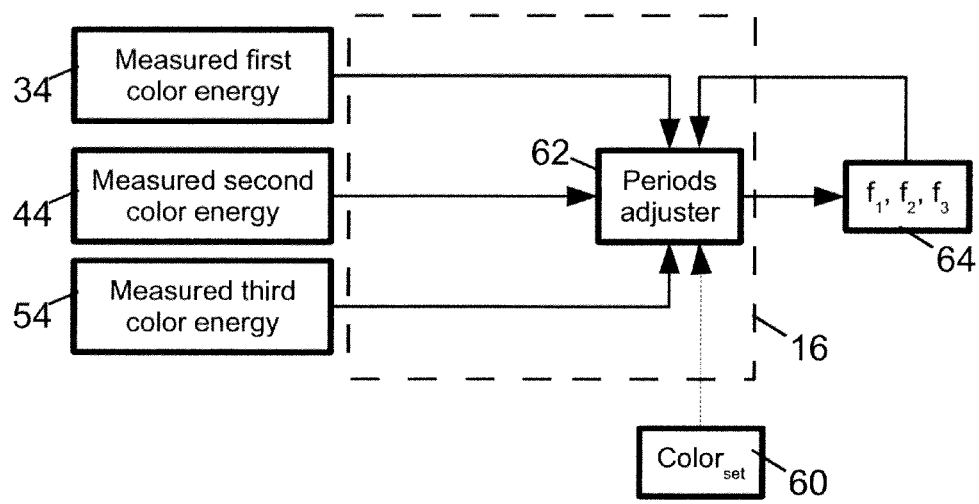
FIG. 4 diagrammatically illustrates the color controller of the illumination system of FIG. 1.

With reference to FIG. 4, the color controller 16 suitably uses the measured color energies 34, 44, 54 to implement feedback color control as follows. The first measured color energy 34 is denoted herein as $E_{M1}$. The second measured color energy 44 is denoted herein as $E_{M2}$. The third measured color energy 34 is denoted herein as $E_{M3}$. The measured color is then suitably represented by the ratio $E_{M1}:E_{M2}:E_{M3}$. The measured color was achieved using a set of fractional time intervals represented by the proportionality $f_1^{(n)}:f_2^{(n)}:f_3^{(n)}$, where the superscript (n) denotes the $n^{th}$ interval of time period T during which the integrations 32, 42, 52 generated the measured color energies 34, 44, 54.

A desired or setpoint color 60 is suitably represented by the ratio $E_{S1}:E_{S2}:E_{S3}$. A periods adjuster 62 computes adjusted of fractional time intervals 64 represented herein by the proportionality $f_1^{(n+1)}:f_2^{(n+1)}:f_3^{(n+1)}$, where the superscript (n+1) denotes the next interval of time period T which is to be divided into the subintervals $f_1^{(n+1)} \times T$, $f_2^{(n+1)} \times T$, and $f_3^{(n+1)} \times T$, subject to the constraint $f_1^{(n+1)}+f_2^{(n+1)}+f_3^{(n+1)}=1$. It is also known that $f_1^{(n)}+f_2^{(n)}+f_3^{(n)}=1$. The solution is suitably computed using ratios, for example:

$$\frac{E_{S1}}{E_{S2}} = \frac{\left(E_{M1} \times \frac{f_1^{(n+1)}}{f_1^{(n)}}\right)}{\left(E_{M2} \times \frac{f_2^{(n+1)}}{f_2^{(n)}}\right)}, \quad (1)$$

$$\frac{E_{S1}}{E_{S3}} = \frac{\left(E_{M1} \times \frac{f_1^{(n+1)}}{f_1^{(n)}}\right)}{\left(E_{M3} \times \frac{f_3^{(n+1)}}{f_3^{(n)}}\right)}, \text{ and} \quad (2)$$

$$\frac{E_{S2}}{E_{S3}} = \frac{\left(E_{M2} \times \frac{f_2^{(n+1)}}{f_2^{(n)}}\right)}{\left(E_{M3} \times \frac{f_3^{(n+1)}}{f_3^{(n)}}\right)}, \quad (3)$$

which along with the relationship constraint $f_1^{(n+1)}+f_2^{(n+1)}+f_3^{(n+1)}=1$ provides a set of equations in which all parameters are known except the updated fractional time intervals $f_1^{(n+1)}$, $f_2^{(n+1)}$, and $f_3^{(n+1)}$ 64. The updated fractional time intervals $f_1^{(n+1)}$, $f_2^{(n+1)}$, and $f_3^{(n+1)}$ 64 are suitably computed by simultaneous solution of this set of Equations.

In other embodiments, iterative adjustments are used to iteratively adjust the measured optical energies ratio $E_{M1}:E_{M2}:E_{M3}$ toward the color setpoint 60 given by the desired energies ratio $E_{S1}:E_{S2}:E_{S3}$. For example, in one iterative approach whichever measured energy has the largest deviation from its setpoint energy is adjusted proportionately. For example, if the first measured energy 34 deviates most strongly, then the adjustment $f_1^{(n+1)}=(E_{S1}/E_{M1}) \times f_1^{(n)}$ is made. The remaining two fractional time intervals are then adjusted to ensure the condition $f_1^{(n+1)}+f_2^{(n+1)}+f_3^{(n+1)}=1$ is satisfied. This adjustments repeated for each time interval T to iteratively adjust toward the setpoint color 60.

These are merely illustrative examples, and other algorithms can be used to adjust the fractions $f_1$, $f_2$, $f_3$ based on the feedback measured color energies 34, 44, 54 to achieve the setpoint color 60. Moreover, in some embodiments the integrators 32, 42, 52 are omitted and instead the instantaneous power is measured using the photosensor 20. The energy is then calculated by multiplying the instantaneous power times the fractional time interval $f_1 \times T$ (for the first fractional time interval), assuming that the measured instantaneous power is constant over the fractional time interval. Moreover, in some embodiments the measured color energy is represented not as a photometric value but rather as a visually perceived brightness level, by scaling the photometric values measured by the photosensor 20 by the optical response, which is known to be spectrally varying. As used herein, "color energy" is intended to encompass either photometric values or visually perceived brightness levels.

The constant current power source 12 generates a constant current on the timescale of the time interval T for cycling the R/G/B switch 14. However, it is contemplated to adjust the electrical current level to achieve overall intensity variation for the adjustable color light source 10. Such adjustment is suitably performed using a current controller 70 in an open-loop fashion, in which the electrical current level is set in an open-loop fashion using a manual current control dial input, an automatically controlled electrical signal input, or so forth. Note that because the color control operates on a ratio basis (even when using optional optical feedback as described with reference to FIGS. 3 and 4), adjustment of the current level of the constant current source on a time scale substantially larger than the time interval T for the R/G/B cycling has little or no impact on the color control.

Figure 5:
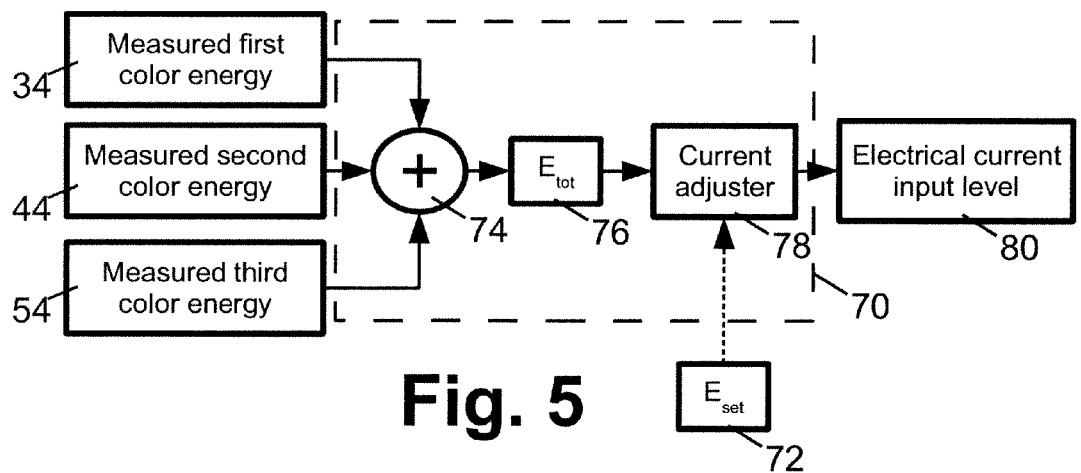
FIG. 5 diagrammatically illustrates the current controller of the illumination system of FIG. 1.

With continuing reference to FIG. 1 and with further reference to FIG. 5, in some embodiments, it is contemplated for the current controller 70 to operate in an optical feedback-controlled mode to achieve a light intensity output corresponding to a setpoint intensity $E_{set}$ 72. In the illustrated feedback-controlled intensity approach, the feedback measured color energies 34, 44, 54 are summed together by an adder 74 to generate a total measured energy $E_{tot}$ 76 that is input to a current adjuster 78 that adjusts the electrical current level 80 of the constant current power source 12 to achieve or approximate the condition $E_{set}=E_{tot}$. The current adjuster 78 can, for example, employ a digital proportional-integral-derivative (PID) control algorithm to adjust the electrical current level 80.

The illustrated embodiments include three color channels, namely R, G, B. However, more or fewer channels can be employed. For n=1, . . . , N channels where N is a positive integer and N>1, the time interval T is divided into N time intervals $f_1 \times T$, . . . , $f_N \times T$ under the condition $f_1 + \ldots + f_N = 1$ where the fractions $f_1$, . . . , $f_N$ are all positive values in the interval [0,1], and the switch 14 is a one-to-N switch.

In the case in which one of the channels is to be off entirely, that is, $f_n=0$, this can be achieved either by having the switch 14 bypass that color channel entirely, or by setting $f_n=\delta$ where $\delta$ is a value sufficiently small that the color corresponding to $f_n=\delta$ is not visually perceived.

The term "color" as used herein is to be broadly construed as any visually perceptible color. The term "color" is to be construed as including white, and is not to be construed as limited to primary colors. The term "color" may refer, for example, to an LED that outputs two or more distinct spectral peaks (for example, an LED package including red and yellow LEDs to achieve an orange-like color having distinct red and yellow spectral peaks). The term "color" may refer, for example, to an LED that outputs a broad spectrum of light, such as an LED package including a broadband phosphor that is excited by photons produced by electroluminescence from a semiconductor chip. An "adjustable color light source" as used herein is to be broadly construed as any light source that can selectively output light of different spectra. An adjustable color light source is not limited to a light source providing full color selection. For example, in some embodiments an adjustable color light source may provide only white light, but the white light is adjustable in terms of color temperature, color rendering characteristics, or so forth.

Figure 6:
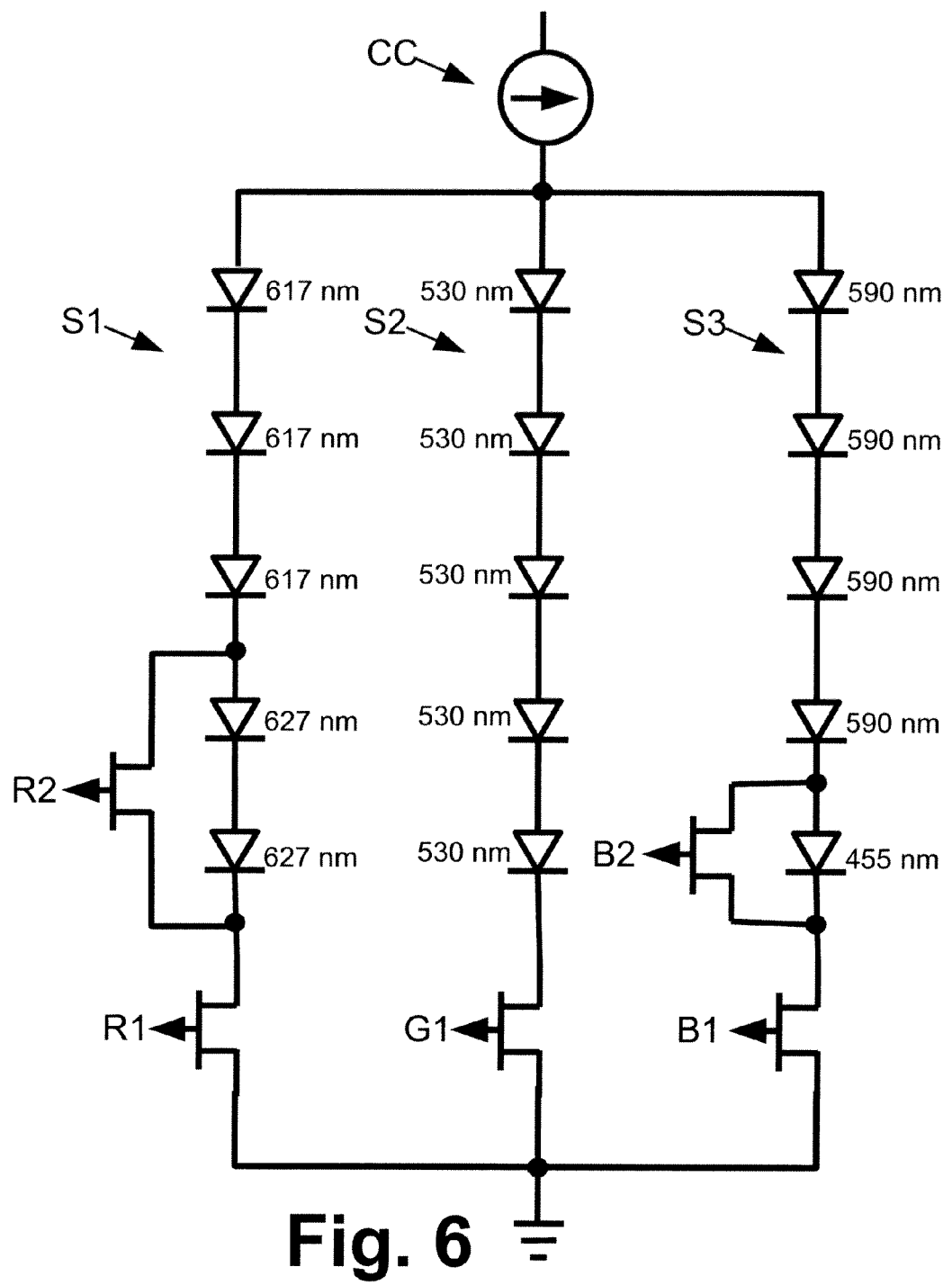
FIG. 6 diagrammatically illustrates an electrical circuit of another adjustable color illumination system.
Figure 7:
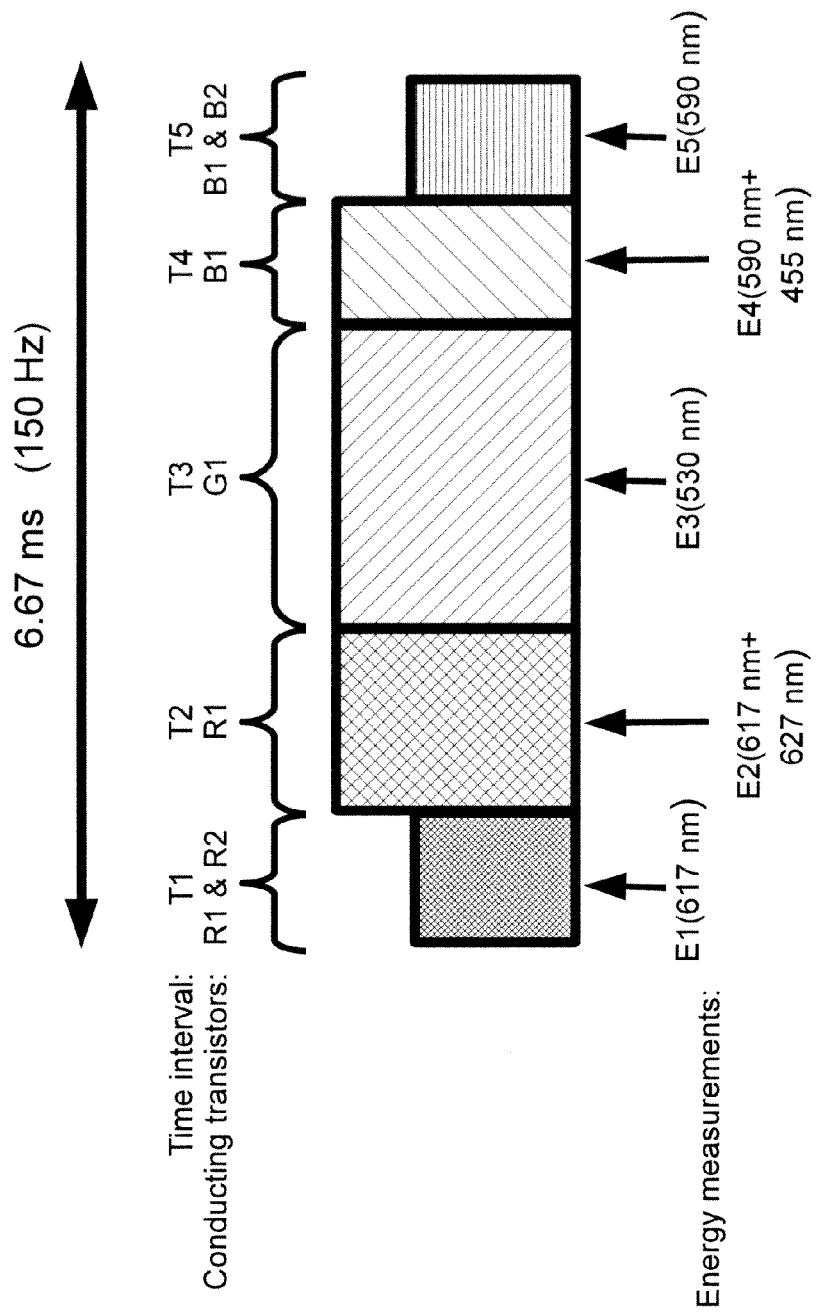
FIG. 7 diagrammatically illustrates a timing diagram for operation of the adjustable color illumination system of FIG. 6.
Figure 8:
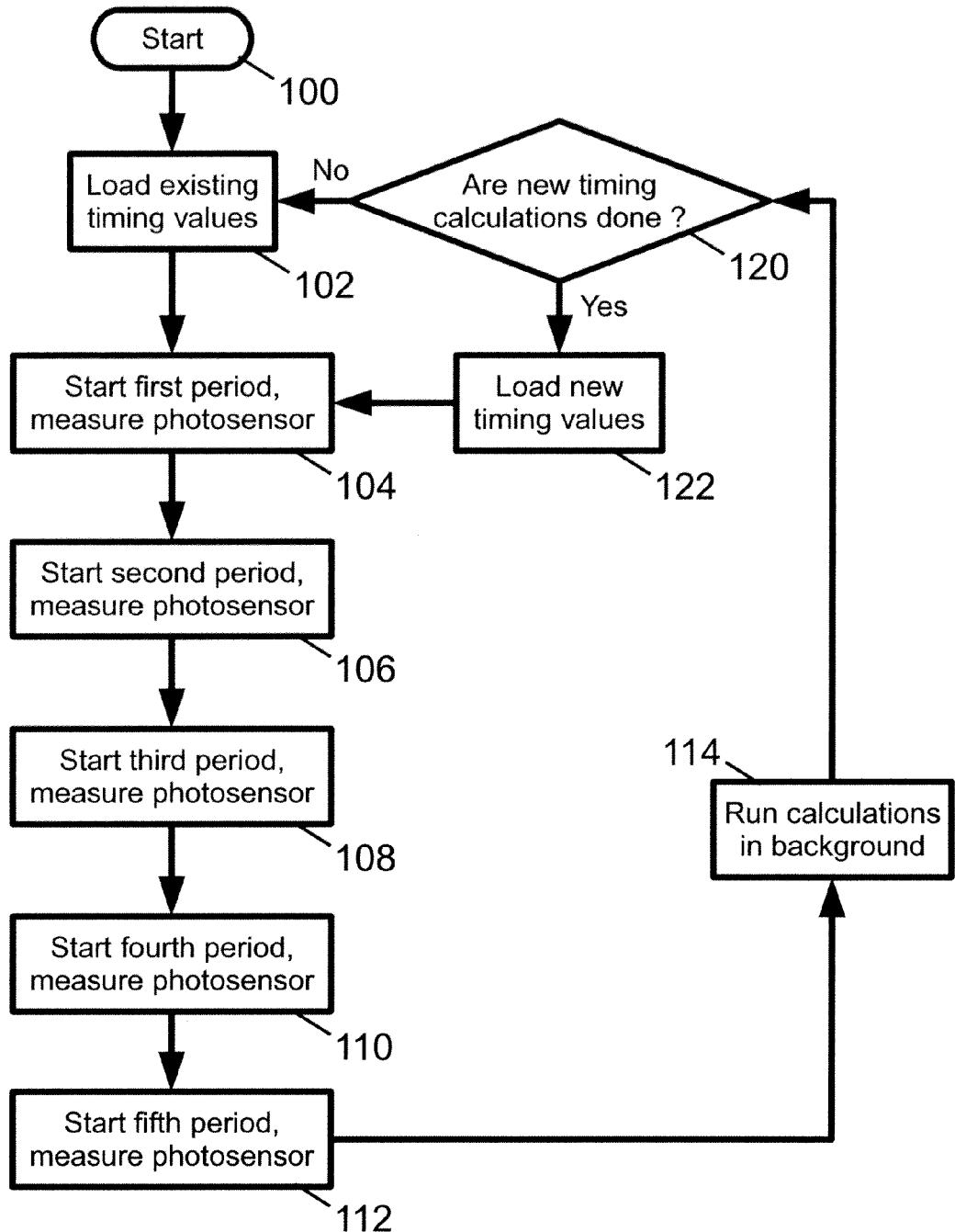
FIG. 8 diagrammatically illustrates a flow chart for operation of the adjustable color illumination system of FIG. 6.

With reference to FIGS. 6-8, another illustrative embodiment is shown as an example. FIG. 6 shows an adjustable color light source in the form of a set of three series-connected strings S1, S2, S3 of five LEDs each. The first string S1 includes three LEDs emitting at a peak wavelength of about 617 mm, corresponding to a shallow red, and two additional LEDs emitting at a peak wavelength of about 627 nm, corresponding to a deeper red. The second string S2 includes five LEDs emitting at 530 nm, corresponding to green. The third string S3 includes four LEDs emitting at a peak wavelength of about 590 nm, corresponding to amber, and one additional LED emitting at a peak wavelength of about 455 nm, corresponding to blue. Drive and control circuitry includes a constant current source CC and three transistors with inputs R1, G1, B1 arranged to block or allow current flow through the first, second, and third LED strings S1, S2, 53, respectively. Additionally, a transistor with input R2 enables the two deeper red (627 nm) LEDs to be selectively shunted, while a transistor with input B2 enables the blue (455 nm) LED to be selectively shunted. An operational state table for the adjustable color light source of FIG. 6 is given in Table 1. Note that the channel color listed for each channel is qualitative, and may be subjectively adjudged differently by different observers. The operational control is configured such that only one of the three LED strings S1, S2, S3 is driven at any given time; accordingly, the same current flows through the 617 nm LEDs of string S1 regardless of whether the R2 transistor is in the conducting or nonconducting state; and similarly the same current flows through the 590 nm LEDs of string S3 regardless of whether the B2 transistor is in the conducting or nonconducting state.

TABLE 1

| Fractional Time Period | Conducting transistors | Channel Illumination Peak Wavelength(s) | Channel Color (Qualitative) |
| --- | --- | --- | --- |
| T1 | R1 and R2 | 617 nm | Red |
| T2 | R1 | 617 nm and 627 nm | Deep red |
| T3 | G1 | 530 nm | Green |
| T4 | B1 | 590 nm and 455 nm | Blue-amber |
| T5 | B1 and B2 | 590 nm | Amber |

FIG. 7 plots the timing diagram for operation of the adjustable color illumination system of FIG. 6. The LED wavelengths or colors of the adjustable color illumination system of FIG. 6 are not selected to provide adjustable full-color illumination, but rather are selected to provide white light of varying quality, for example warm white light (biased toward the red) or cold white light (biased toward the blue). The adjustable color illumination system of FIG. 6 has five color channels as labeled in Table 1. In illustrative FIG. 7 the five transistors are operated to provide a one-to-five switch operating over a time interval T which in FIG. 7 is $\frac{1}{150}$ sec (6.67 ms) in accordance with a selected time division of the time interval T to generate white light with selected quality or characteristics. The time interval $T=\frac{1}{150}$ sec is shorter than the flicker fusion threshold for a typical viewer. The time interval T is time-division multiplexed into five fractional time periods T1, T2, T3, T4, T5 where the five fractional time periods T1, T2, T3, T4, T5 are non-overlapping and sum to the time interval T, that is, T=T1+T2+T3+T4+T5. In the embodiment of FIG. 7, the color energy measurement for each color channel is acquired at an intermediate time substantially centered within each fractional time period, as indicated in FIG. 7 by the notations "E( . . . nm)" indicating the operating wavelengths at each color energy measurement.

With reference to FIG. 8, a control process suitably implemented by the control circuitry including the five transistors shown in FIG. 6 is illustrated. At a starting time 100 existing time values for the fractional time periods T1, T2, T3, T4, T5 are loaded 102 into a controller. This is followed by successive operations 104, 106, 108, 110, 112 initiate the five fractional time periods T1, T2, T3, T4, T5 in succession and perform energy measurements using a single photosensor. A calculation block 114 uses the measurements to compute updated values for the fractional time periods T1, T2, T3, T4, T5. For example, the relationship $[E1 \cdot T1]/[E2 \cdot T2]=C_{12}$ where $C_{12}$ is a constant reflecting the desired red/deep red color ratio is suitably used to constrain the fractional time periods T1 and T2; the relationship $[E2 \cdot T2]/[E3 \cdot T3]=C_{23}$ where $C_{23}$ is a constant reflecting the desired deep red/green color ratio is suitably used to constrain the fractional time periods T2 and T3; the relationship $[E3 \cdot T3]/[E4 \cdot T4]=C_{34}$ where $C_{34}$ is a constant reflecting the desired green/blue-amber color ratio is suitably used to constrain the fractional time periods T3 and T4; and the relationship $[E4 \cdot T4]/[E5 \cdot T5]= C_{45}$ where $C_{45}$ is a constant reflecting the desired blue-amber/amber color ratio is suitably used to constrain the fractional time periods T4 and T5. The calculation block 114 suitably simultaneously solves these four equations along with the constraint T=T1+T2+T3+T4+T5 to obtain the updated values for the fractional time periods T1, T2, T3, T4, T5. In some embodiments, the calculation block 114 operates in the background in an asynchronous fashion respective to the cycling of the light source at the time interval T. To accommodate such asynchronous operation, a decision block 120 monitors the calculation block 114 and continues to load existing timing values 102 until the updated or new timing values are output by the calculation block 114, at which time the new timing values are loaded 122.

It will be appreciated from the example of FIGS. 6-8 that the time-division multiplexing does not necessarily require that the LEDs be allocated in an exclusive manner between the fractional time periods. In the embodiment of FIGS. 6-8, for example, the amber LEDs emitting at 590 nm are operational during both the fourth fractional time period T4 and the fifth fractional time period T5. The embodiment of FIGS. 6-8 also illustrates that the color channels can correspond to different shades (e.g., shallow red versus deeper red), and that a given color channel may emit light of two or more distinct peaks at different colors (for example, during the fractional time period T4 both amber light peaked at 590 nm and blue light peaked at 455 nm are emitted).

Having described the illustrative TDM color mixing scheme, the application of color mixing light sources to vehicle signal lighting is next addressed with reference to FIGS. 9-16. It is emphasized that the TDM color mixing scheme is described herein merely as an illustrative example. In general, the disclosed vehicle signal lighting assemblies including one or more color mixing light sources can employ any color mixing scheme, including but not limited to TDM, PWM, PFM, PAM, continuous d.c. or a.c. control, or so forth.

Color mixing light sources are typically used in applications that call for providing illumination of a number of different discrete colors, or that call for providing illumination of continuously or quasi-continuously variable color. For example, theatre lighting comprising color mixing light sources are known. In contrast, regulatory standards impose strict constraints on the allowable colors used in vehicle signal lights. For example, a taillight or a brake light is typically required to be red, and only red, while a turn indicator signal is typically required to be yellow in Europe, or either yellow or red in the United States. Backup lights are typically required to be white. Similarly restrictive color palettes are typically imposed on other vehicle signal lights, such as side signal lighting. It is known in the art that employing a limited and uniform palette of colors for signal lighting, with each color indicating one or, at most, a small number of different signals, enhances the likelihood that other road users will rapidly and accurately discern the meaning of a vehicle signal light.

Moreover, using color mixing light sources for vehicle signal lighting can be expected to increase the per-unit signaling light assembly cost as compared with using single-color incandescent or LED lamps, due to the relatively higher complexity and number of components in a color mixing light source. The vehicle manufacturing industry is highly competitive and cost conscious.

It is recognized herein, however, that color mixing light sources can nonetheless be used to substantial benefit in vehicle lighting assemblies. This conclusion is reached by considering the cost benefit achieved by a reduction in the number of stock keeping unit (SKU) lines that need to be maintained by a vehicle manufacturer operating on a global scale. As disclosed herein, a single signal light assembly SKU line employing one or more color mixing light sources can advantageously be used in many different geographical regions, even if those regions have mutually incompatible vehicle signal lighting standards. Additionally, it is recognized herein that a modular configuration of a signal light assembly employing a single color mixing light source that is optically coupled with different optical module constructions can serve different vehicle makes/models. Moreover, it is recognized herein that a signal light assembly employing color mixing light sources is readily reconfigured to incorporate new signal lighting paradigms, such as an illustrative green "accelerator light". This makes the deployment of new types of signal lighting cost-effective, even for relatively small markets. Still further, it is recognized herein that a signal light assembly employing at least one color mixing light source is readily configured to be adjustable in real-time in response to changing environmental conditions. For example, disclosed real-time adjustment of the "shade" or "hue" or, more generally, the color point, of a red tail light or brake light enables the signal to be more readily perceived in low-visibility driving conditions. In addition, it is recognized herein that a signal light assembly employing a single color mixing light source can generate intensified level of light signal by changing the area ratio dedicated for the different signaling functions of the signal light assembly.

Figure 9:
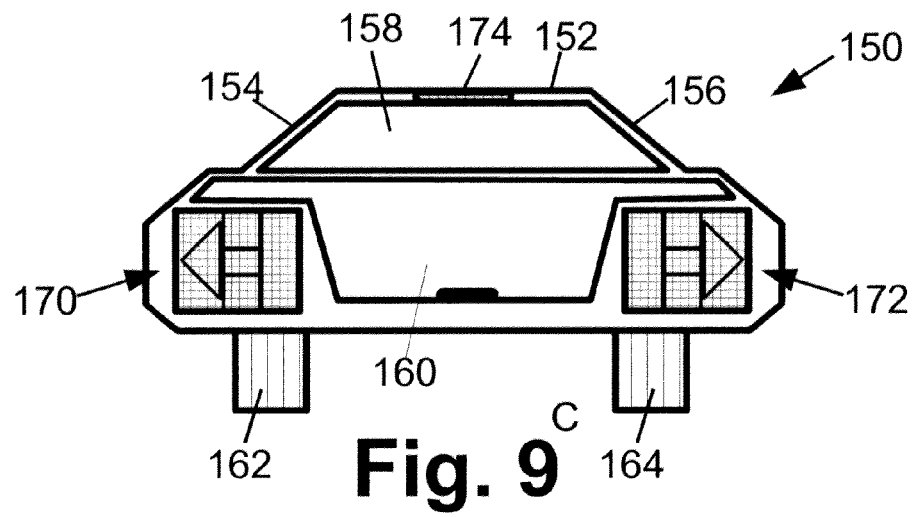
FIG. 9 diagrammatically shows a rear view of an automobile including illustrative left and right taillight assemblies.

With reference to FIG. 9, a rear view of a vehicle 150 is shown. The depicted rear view shows the roof 152, left- and right-side window lines 154, 156, a rear window 158, a trunk 160, and left and right rear tires 162, 164. The illustrative vehicle 150 also includes other components not visible in the rear view, such as a hood, front tires, front and side windows, front headlights, and so forth, as well as internal components such as an engine (which may be diesel, gasoline, electric, gasoline/hybrid electric, or so forth), transmission, emissions system, and so forth. These components are not illustrated, but are well known in the art. Moreover, while the illustrated vehicle 150 is an automobile, it is to be understood that the vehicle can also be a pickup, hatchback vehicle, sport-utility vehicle (SUV), commercial truck, semi-trailer truck or tractor trailor (sometimes known as a "semi" or "18 wheeler", although the number of wheels can be other than eighteen), road plow, snowmobile, motorcycle, scooter, bicycle, tricycle, or other vehicle for which the disclosed vehicle signal light assemblies may be useful.

The vehicle 150 includes various signal light assemblies, of which a left taillight assembly 170, right taillight assembly 172, and center taillight assembly 174 are visible in the depicted rear view. Other signal light assemblies that are typically included on at least some vehicles, but which are not visible in the rear view, include side lighting assemblies, front indicator/parking light assemblies, and so forth. The illustrated left and right taillight assemblies 170, 172 are generally similar except for having a bilateral reflection symmetry about a vertical plane; accordingly, the left taillight assembly 170 is described in some detail herein, with it being understood that the description also applies in substance to the right taillight assembly 172.

Figure 10:
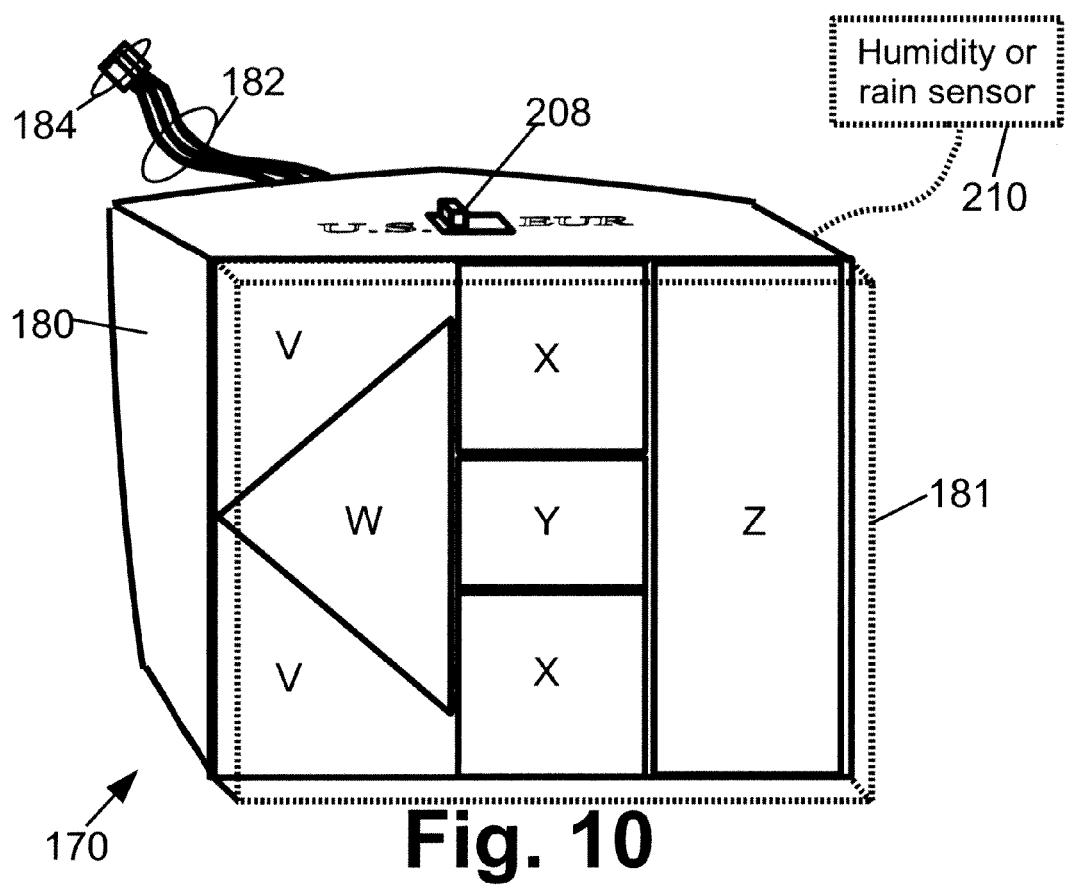
FIG. 10 diagrammatically shows a perspective view of the left taillight assembly of the automobile of FIG. 9.

With reference to FIG. 10, a detailed perspective view of the left taillight assembly 170 is shown. The left taillight assembly 170 includes a plurality of color mixing light sources V, W, X, Y, Z disposed on a support element 180 configured to support the color mixing light sources V, W, X, Y, Z on the vehicle 150 as a signal light, and specifically in the illustrated embodiment as a left taillight. The support element 180 is mechanically configured, that is, appropriately sized and shaped, to fit into a receiving receptacle (not shown) at the rear end of the vehicle 150. In other embodiments, the support element may take other shapes and configurations designed to mount in or on an end or side of the vehicle. The support element may be specific to a particular make or model of vehicle, or may be specific to a particular manufacturing year of a particular vehicle make and model. On the other hand, if the manufacturer uses a common signal light receptacle design for a range of models, then the support element may be suitably installed in any vehicle of that range of compatible models. In some embodiments, the support element may be configured as a retrofit unit shaped and sized to retrofit into a mount or receptacle designed to hold an incandescent lamp-based signal light assembly or other "original equipment manufacturer" signal light assembly.

The support element 180 is also electrically configured to mate with electrical taillight assembly connections of the vehicle 150. Toward this end, the illustrated support element 180 includes a pigtail 182 with distal connectors 184 sized, shaped, of suitable electrical conductor wire gauge, and otherwise electrically and structurally configured to mate with taillight assembly control signal and power connectors of the vehicle 150 (not shown). While a pigtail connector assembly 182, 184 is illustrated, in other embodiments the connector assembly may comprise a socket or other suitable electrical connector configuration. In some embodiments, the support element 180 may provide electrical ground or otherwise be incorporated into the electrical configuration of the taillight assembly 170.

Each of the illustrated color mixing light sources V, W, X, Y, Z disposed on the support element 180 include a plurality of interspersed pluralities of LEDs including at least a first plurality of LEDs emitting light of a first color and an interspersed second plurality of LEDs emitting light of a second color different from the first color. The LEDs are not shown in FIG. 10, but it is to be understood that each of the illustrated color mixing light sources V, W, X, Y, Z may, for example, have the configuration of the light source 10 shown in FIG. 1 which includes red, green, and blue LEDs (where it is again emphasized that, for example, the term "red LED" indicates an LED that emits light of a red color, and does not necessarily relate to the color of the LED when nonoperational). In other embodiments, the first, second, and optional additional pluralities of LEDs may be of different colors so long as the colors are sufficient to mix to generate signal lighting of the range of colors desired to be output by the color mixing light source.

The layout of the plurality of interspersed pluralities of LEDs for each color mixing light source is selected to provide a desired shape or area coverage, which in some embodiments may be a non-contiguous shape or area. For example, the color mixing light source V encompasses two non-contiguous triangular areas that are separated by the triangular color mixing light source W. The areas of the two color mixing light sources W, V are selected to collectively define a left arrow (for the left taillight assembly 170 as seen in FIGS. 9 and 10) or are selected to collectively define a right arrow (for the right taillight assembly 172 as seen in FIG. 9). Optionally, a transparent or translucent cover 181 (shown in FIG. 10) may be disposed over the taillight assembly 170. Since the color mixing light sources V, W, X, Y, Z provide light color control, the transparent or translucent cover 181 advantageously can be constructed as a single piece that covers all five light sources V, W, X, Y, Z. In some contemplated embodiments, all five color mixing light sources V, W, X, Y, Z are substantially of the same shape constituting an array of color mixing light sources, while the final geometry of the radiating areas on the signal light assembly are created by proper combination of different optical components such as a lens, a reflector, a light guide or other optics or combination of these for mixing, collimating, diverging, or otherwise shaping or adjusting the light emitted by the single individual segments of the array.

Figure 11:
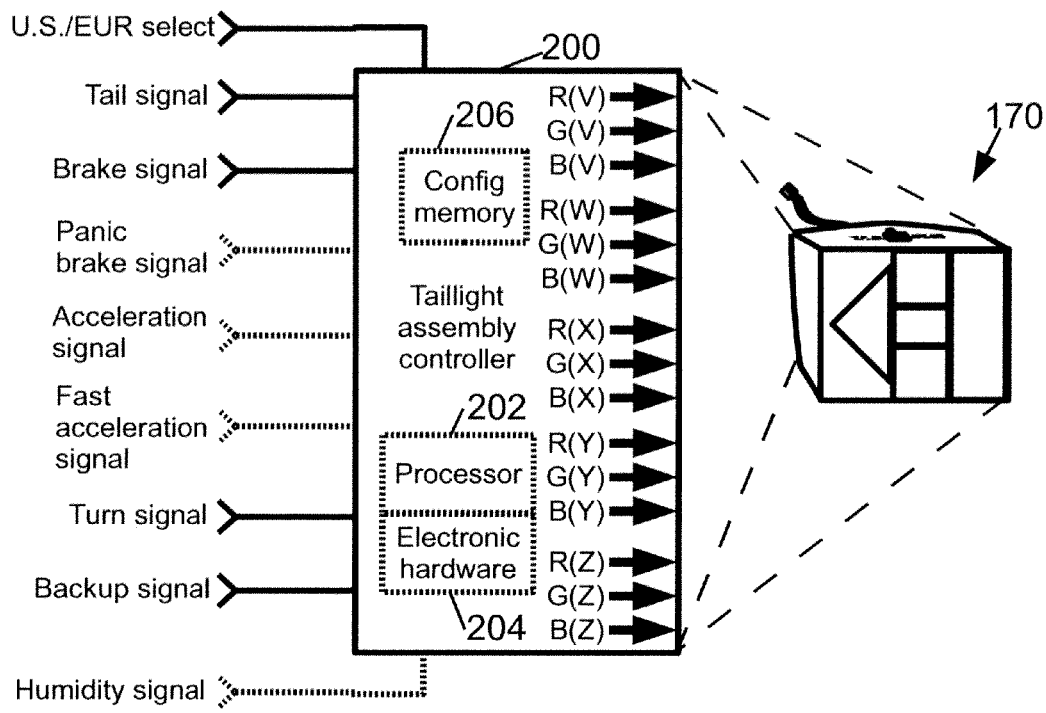
FIG. 11 diagrammatically shows an electrical block diagram of the left taillight assembly of FIG. 10.

With continuing reference to FIG. 10 and with further reference to FIG. 11, the taillight assembly 170 also includes a controller 200 that is configured to independently and selectively drive each plurality of LEDs of each of the color mixing light sources V, W, X, Y, Z so as to selectively generate light of at least two different selectable visually perceived colors. For each color mixing light source, at least one the selectable visually perceived colors comprises a mixture of at least light of the first color generated by driving the first plurality of LEDs and light of the second color generated by driving the second plurality of LEDs. The independent control signals for the pluralities of red, green, and blue LEDs of the color mixing light source V are indicated in FIG. 11 as R(V), G(V), and B(V) respectively, and the control circuitry for generating these signals is suitably embodied as shown in FIG. 1 in an illustrative TDM color mixing embodiment. In similar fashion: independent control signals for the pluralities of red, green, and blue LEDs of the color mixing light source W are indicated in FIG. 11 as R(W), G(W), and B(W) respectively; independent control signals for the pluralities of red, green, and blue LEDs of the color mixing light source X are indicated in FIG. 11 as R(X), G(X), and B(X) respectively; independent control signals for the pluralities of red, green, and blue LEDs of the color mixing light source Y are indicated in FIG. 11 as R(Y), G(Y), and B(Y) respectively; and independent control signals for the pluralities of red, green, and blue LEDs of the color mixing light source Z are indicated in FIG. 11 as R(Z), G(Z), and B(Z) respectively.

The controller 200 further receives input signals via the connector assembly 182, 184, which in the embodiment illustrated in FIG. 11 include at least: a "Tail signal" corresponding to the taillight indicator signal generated by the automobile 150 when, for example, the driver turns on the vehicle headlights; a "Brake signal" corresponding to the brake indicator signal generated by the automobile 150 whenever the driver depresses the brake pedal or otherwise activates the vehicle brakes; a "Turn signal" corresponding to the turn signal indicator signal generated by the automobile 150 when the driver activates the turn signal control lever or otherwise activates the turn signal; and a "Backup signal" corresponding to the backup indicator signal generated by the automobile 150 whenever the vehicle transmission is placed into reverse. It is to be understood that the "Turn signal" can be a left turn signal indicator that is wired into the left taillight assembly 170, or can be a right turn signal indicator that is wired into the left taillight assembly 172. The "Tail signal", "Brake signal", "Turn signal", and "Backup" signal inputs are consonant with existing vehicle signaling standards (as of May 2011) employed in the United States, Europe, and most other geographical regions.

The controller 200 is typically housed within or otherwise supported by the support element 180, or is otherwise a component of the taillight assembly 170, so that the taillight assembly 170 is a single installable unit that can be installed on or in the vehicle 150 by mounting the support element 180 on or to or in a corresponding surface, recess, receptacle or the like of the vehicle 150 and electrically connecting the connector assembly 182, 184 with a mating electrical connector of the vehicle 150. (In some contemplated embodiments, mounting the support element 180 on the vehicle 150 may simultaneously effectuate "plugging in" or otherwise connecting the electrical connector assembly 182, 184.) However, it is also contemplated for the controller 200 to be physically separate from the illumination unit defined by the support element 180 and the supported plurality of interspersed pluralities of LEDs of the color mixing light sources V, W, X, Y, Z.

With reference to FIGS. 1 and 11, the light output by the taillight assembly 170 responsive to a given input signal is controlled by a processor 202 and cooperating electronic hardware 204 that embody controller components such as the R/G/B switch 14 (where one such switch is provided for each of the color mixing light sources V, W, X, Y, Z) color controller 16, current controller 70, and optional optical feedback control components 20, 22. The constant current power source 12 is also typically embodied as part of the electronic hardware 204, although it is also contemplated for external constant current power to be provided to the controller 200. The processor 202 also performs suitable transformation of the input signal to generate the desired or setpoint color (Color$_{set}$) 60 and the setpoint intensity (E$_{set}$) 72 for each of the color mixing light sources V, W, X, Y, Z. The transformation performed by the processor 202 is determined by programming of the processor 202 and by one or more configuration settings that are stored in an electronic configuration memory 206, which may be, for example: an electronically erasable programmable read-only-memory (EEPROM); a flash memory; a field-programmable gate array (FPGA); or so forth. Some contemplated configuration settings include, for example: a geographical region configuration setting; a vehicle model configuration setting; a vehicle trim configuration setting; a "show mode" in which configuration the processor 202 causes the taillight assembly 170 to emit a flashing multicolor or other attention-grabbing light pattern (for example, intended for use when the vehicle is parked, or when being displayed at the automobile dealership); or so forth. The configuration settings may be loaded into the memory 206 by various pathways, such as by a wired or wireless firmware update pathway (for example, a digital input jack such as a USB port, serial poll, custom port, Bluetooth connection, or so forth that connects the controller 200 with a computer or other digital device (not shown) to load or update the configuration parameters. In some embodiments, one or more configuration settings may be loaded by a mechanical switch, such as an illustrated geographical region selection switch 208 disposed on a top of the support element 180. The illustrated geographical region selection switch 208 has two settings: "U.S." (switch moved to the left); and "EUR" (i.e., "Europe", switch moved to the right). Although not illustrated, a three-setting switch or a plurality of dip switches or the like may be used to accommodate more selectable geographical regions if desired. In the illustrated embodiment, the setting of the geographical region selection switch 208 is read by the processor 202 and suitable settings are loaded into the configuration memory 206; however, it is also contemplated to omit the configuration memory 206 and have the processor 202 directly read the geographical region selection switch 208 (or other mechanical switch) to determine one or more configuration settings. In other embodiments, the configuration settings loaded into the memory 206 may be user programmable. By way of illustrative example, the dealer may optionally load user programmed settings selected by the vehicle purchaser so that the operation of the taillight assembly 170 conforms with the purchaser's personal choices (so that the taillight is a "designer" taillight). As another illustrative example, the dealer or manufacturer may load specially programmed settings for vehicles intended for specialized uses such as unmarked police cars, emergency vehicles, or so forth.

The processor 202 and electronic hardware 204 receive the input signal (that is, the "Tail signal", "Brake signal", "Turn signal", and "Backup signal" input lines which are suitably embodied by the connector assembly 182, 184) and generate output signals R(V), G(V), B(V), R(W), G(W), B(W), R(X), G(X), B(X), R(Y), G(Y), B(Y), R(Z), G(Z), B(Z) to drive the plurality of interspersed pluralities of LEDs of the color mixing light sources V, W, X, Y, Z to generate signal light in accordance with the received input signal. Table 1 lists some suitable light outputs.

TABLE 1

| Signal(s) | Light source V | Light source W | Light source X | Light source Y | Light source Z |
|---|---|---|---|---|---|
| Tail | Low red | Low red | Low red | Low red | Low red |
| Tail + brake | High red | High red | High red | High red | High red |
| Tail + turn | Low red | Flashing yellow/low red | Low red | Flashing yellow/low red | Low red |
| Tail + backup | Low red | Low red | Low red | Low red | White |
| Tail + brake + turn | High red | Flashing yellow/high red | High red | Flashing yellow/high red | High red |
| Tail + brake + backup | High red | High red | High red | High red | White |
| Tail + brake + turn + backup | High red | Flashing yellow/high red | High red | Flashing Yellow/high red | White |
| Tail + turn + backup | Low red | Flashing yellow/low red | Low red | Flashing yellow/low red | White |
| Brake | High red | High red | High red | High red | High red |
| Brake + turn | High red | Flashing yellow/high red | High red | Flashing yellow/high red | High red |
| Brake + backup | High red | High red | High red | High red | White |
| Brake + turn + backup | High red | Flashing yellow/high red | High red | Flashing yellow/high red | White |
| Turn | Off | Flashing yellow | Off | Flashing yellow | Off |

TABLE 1-continued

| Signal(s) | Light source V | Light source W | Light source X | Light source Y | Light source Z |
|---|---|---|---|---|---|
| Turn + backup | White | Flashing yellow | White | Flashing yellow | White |
| Backup | White | White | White | White | White |

The colors listed in Table 1 are visually perceived colors. The visually perceived color yellow is suitably generated by color mixing of the interspersed pluralities of red and green LEDs at approximately equal intensities. The visually perceived color white is suitably generated by color mixing of the interspersed pluralities of red, green, and blue light at approximately equal intensities. The visually perceived color red is suitably generated by operating the plurality of red LEDs alone, or by operating the plurality of red LEDs at a high relative intensity together with one or both of the plurality of green LEDs and/or the plurality of blue LEDs operated at a relatively low intensity to provide a red color point that is shifted slightly toward the green or blue. The term "flashing yellow" indicates the red and green LEDs of the color mixing light source are cycled on and off at a rate substantially slower than the human eye response, so that the human eye perceives the flashing (this "flashing" is to be distinguished from the fast switching rate employed in PWM, TDM, or other "switching-type" color mixing schemes in which the fast switching rate is so fast as to be visually imperceptible so as to generate a time-integrated color mixture). Similarly, the terms "flashing yellow/low red" and "flashing yellow/high red" indicate slow (i.e., visually perceived "flashing") between yellow (generated by operating the pluralities of red and green LEDs) and red (generated, for example, by operating the plurality of red LEDs alone).

Table 1 sets forth signal lights for various input signals that comport generally with existing road regulations in the United States and Europe as of May 2011. However, the detailed signal requirements may differ regionally. For example, although most geographical regions use red signal lighting for taillighting and for brake lighting, the specific allowable color points within the red spectral region may be different in different geographical regions. When using an LED signal lamp that does not employ color mixing, each geographical regional variation requires a different taillight assembly, and hence a different SKU line. In contrast, with the taillight assembly of FIGS. 9-11, such geographical differences can be accommodated in a single SKU line, by making appropriate configuration setting changes (for example, by installing a firmware update, or by setting the appropriate setting on a mechanical configuration switch). A vehicle assembly facility can therefore stock a single SKU line, and configure the taillight assembly for the intended destination country at the assembly facility. If the vehicle manufacturer employs a "just-in-time" delivery system or otherwise needs to re-allocate the vehicle after manufacture, refitting the vehicle taillight assemblies for the new geographical region destination entails merely resetting the taillight assembly configuration settings, for example by resetting the switch 208 or by loading a firmware update.

Moreover, the configuration settings can be adjusted to accommodate incremental changes in governing regulations. For example, if the United States were to update its road regulations to require a different shade of red for tail lighting, such a change in governing regulations can be readily accommodated by changing the configuration settings. Indeed, such a change could even be made retroactively, by making the appropriate firmware update on existing vehicle taillight assemblies.

Still further, the taillight assemblies 170, 172 can readily implement additional features not readily provided in existing taillights. For example, due to cost considerations the same red lamp is sometimes used for both taillighting and brake lighting. As a result, the brake light is identical with the taillight except for the intensity, which is higher during braking. However, the taillight assemblies 170, 172 can readily provide a slight change in the shade or hue of the red color point to provide a further visual indicium of braking. For example, the "low red" corresponding to tail lighting can be implemented as an "orangish" red, that is, by a red whose color point is shifted slightly toward green, by operating the plurality of red LEDs at high relative intensity together with the plurality of green LEDs operating at low relative intensity to shift the color point slightly. The brake lighting then is suitably implemented by operating the red LEDs alone, providing a more "pure" red color point during braking.

The ability to adjust operation of the taillight assemblies 170, 172 via the configuration settings can also be useful to differentiate different trims of the same vehicle model. In the automobile industry, it is common to market substantially the same vehicle, that is, the same model of vehicle, in different trims where the higher trims provide additional enhancements or features at higher cost. For example, the base trim may have manual windows and door locks and plain decoration, whereas a higher trim may have automatic windows and door locks and additional decoration such as decorative side strips or so forth. Using the taillight assemblies 170, 172, it is straightforward to implement such trim-based differences at the signal lighting level. For example, in the United States either flashing red or flashing yellow lighting can be used for turn indicators. It is contemplated to program the controller 200 via the configuration settings to use flashing red turn indicators for the base trim, and to use flashing yellow indicators for higher trims. Similarly, other trim-based variations in the signal lighting can be readily implemented.

The operation of the taillight assemblies 170, 172 as described with reference to Table 1 is conventional and complies with existing vehicle signal regulations in the United States as of May 2011. However, it is contemplated to provide additional signal lighting capability that may or may not be compliant with existing vehicle signal regulations in the United States. These additional signal lighting capabilities may be allowable in other geographical regions, and/or may be allowable in the United States but not in common use, and/or may be capabilities that could become allowable in the United States or other geographical regions at some time in the future due to evolution of applicable legal regulations. Some contemplated additional signal capabilities that can be implemented using the taillight assemblies 170, 172 are set forth in Table 2.

TABLE 2

| Signal(s) | Light source V | Light source W | Light source X | Light source Y | Light source Z |
|---|---|---|---|---|---|
| Tail + Accelerating | Low red | Low red | Low red | Low red | Green |
| Tail + faster accelerating | Low red | Low red | Green | Green | Green |
| Accelerating | Off | Off | Off | Off | Green |
| Faster accelerating | Off | Off | Green | Green | Green |
| Panic brake | High red | High red | Flashing high red + yellow | Flashing high red + yellow | High red |

The use of the color mixing light sources V, W, X, Y, Z in the taillight assemblies 170, 172 makes implementation of such additional capabilities straightforward. For the panic brake signal, an additional input called "Panic brake signal" in FIG. 11 is indicated in phantom as provided to the controller 200, which is indicative of an especially fast and hard braking event (that is, a "panic braking" event). Similarly, an "acceleration signal" and a "fast acceleration signal" is indicated in phantom as provided to the controller 200, which is indicative of acceleration and faster acceleration, respectively. In some embodiments, the "acceleration signal" is activated responsive to the throttle (that is, the "gas pedal") being depressed, while the "faster acceleration signal" is activated responsive to increased throttle activation.

Figure 12:
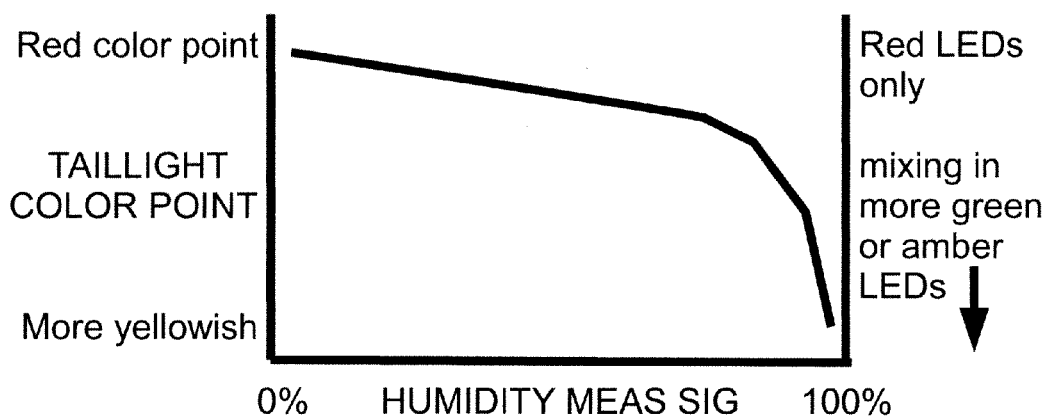
FIG. 12 plots a color point adjustment for red tail and/or red brake signal lighting as a function of a humidity measurement signal.

With continuing reference to FIGS. 9-11 and with further reference to FIG. 12, another optional capability that can be readily incorporated is real-time adjustment of the signal lighting in response to a changing environmental condition, such as precipitation, humidity, visibility, altitude, or ambient light. Toward this end, an environmental sensor, such as a humidity or rain sensor 210 (shown in phantom in FIG. 10) is integrated into or in operative communication with the controller 200. The environmental sensor 210 can be integral with or (as shown) separate from the taillight assembly 170. Based on a signal received by the controller 200 from the sensor 210, a signal light is adjusted. For example, based on the sensed humidity or precipitation, a high relative intensity of the plurality of red LEDs and/or a low relative intensity of the plurality of green LEDs or plurality of blue LEDs can be adjusted to adjust the color point of the visually perceived red color. It has been observed that human visual perception of a "yellowish" red light is better in poor visibility conditions (such as fog, rain, or other high humidity conditions) than is human visual perception of a more pure red light. Accordingly, the controller 200 can include a look-up table or mathematical function such as that depicted in FIG. 12, which outputs a more yellowish color point for the red color light as the humidity increases. As indicated on the right-hand side of FIG. 12, this can be accomplished by mixing in more green light. In embodiments in which the color mixing light source includes interspersed pluralities of red and amber LEDs, but no green or blue LEDs, a similar effect can be achieved by mixing in more yellow or amber light. Similarly, the preferred color point for red light may change with altitude (higher altitude typically correlates with less dense air, which may tend to motivate toward a more pure red light), ambient light intensity, or so forth. While adjustment of the color point of the red light is illustrated, it is also contemplated to adjust the yellow or amber color point of the turn signal and/or the color temperature or other characteristics of the white backup signal.

Figure 13:
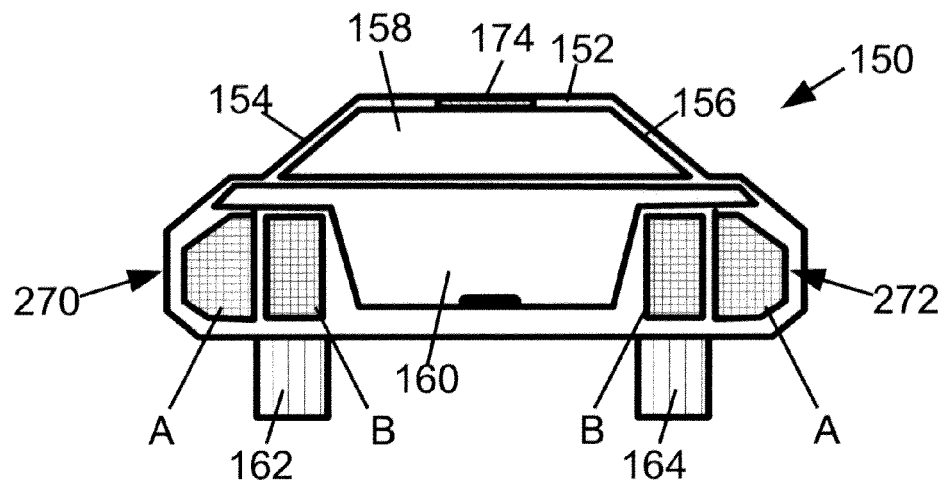
FIGS. 13 and 14 diagrammatically show a rear view of an automobile including additional illustrative left and right taillight assemblies.
Figure 14:
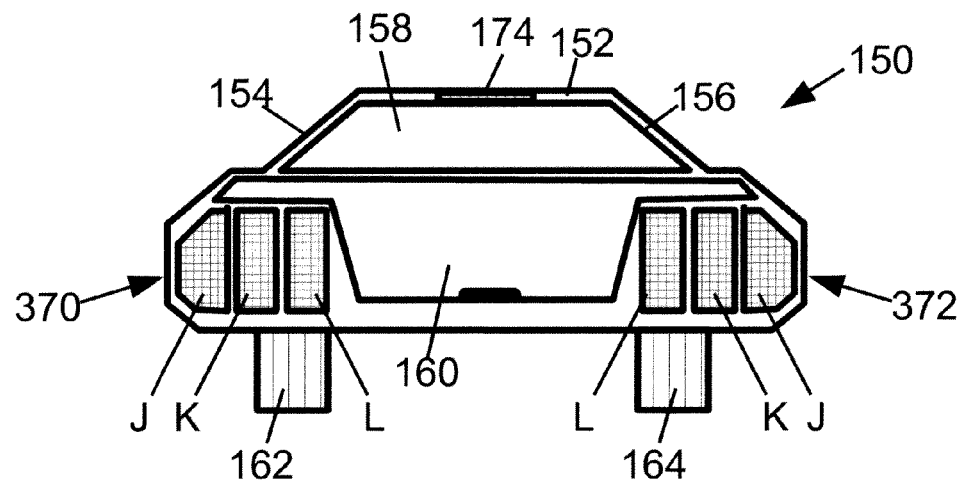

With reference to FIGS. 13 and 14, other configurations can be used for the taillight assemblies, and in some such configurations one or more color mixing light sources may be combined with one or more LED-based or non-LED-based lamps that are not color mixing light sources. FIG. 13 depicts left and right taillight assemblies 270, 272 which each include two light sources A, B, of which one or both is a color mixing light source. FIG. 14 depicts left and right taillight assemblies 370, 372 which each include three light sources J, K, L of which at least one is a color mixing light source.

With particular reference to FIG. 13, in some embodiments lamp A is a color mixing light source, while lamp B is a white lamp that is not a color mixing light source. The taillight assemblies 270, 272 can provide full tail/brake/turn/backup signaling capability, for example as set forth in Table 3.

TABLE 3

| Signal(s) | Lamp A | Lamp B |
|---|---|---|
| Tail | Low red | Off |
| Tail + brake | High red | Off |
| Tail + turn | Flashing low red/yellow | Off |
| Tail + backup | Low red | White |
| Tail + brake + turn | Flashing high red/yellow | Off |
| Tail + brake + backup | High red | White |
| Tail + brake + turn + backup | Flashing high red/yellow | White |
| Tail + turn + backup | Flashing low red/yellow | White |
| Brake | High red | Off |
| Brake + turn | Flashing high red/yellow | Off |
| Brake + backup | High red | White |
| Brake + turn + backup | Flashing high red/yellow | White |
| Turn | Flashing yellow | Off |
| Turn + backup | Flashing white/yellow | White |
| Backup | White | White |

Lamp B provides only white light to indicate backup, and accordingly can be embodied by any white light source, including for example: a white incandescent lamp; a white LED-based lamp; or so forth. Lamp A in various signaling modes emits red, yellow, or white light, and is suitably embodied as a color mixing light source. Advantageously, when lamp A generates light of a white color, the ratio of red, green, and blue intensities can be tuned based on the configuration settings in order to closely match the color temperature and other characteristics of the white lamp B. Alternatively, lamp A can be configured to generate white light of different characteristics, for example to provide a complementary white illumination.

In other embodiments, lamp B is also a color mixing light source. In such embodiments, the combination of lamps A, B can be used together to provide signal lighting of larger area, as illustrated in Table 4.

TABLE 4

| Signal(s) | Lamp A | Lamp B |
|---|---|---|
| Tail | Low red | Low red |
| Tail + brake | High red | High red |
| Tail + turn | Flashing low red/yellow | Flashing yellow/low red |
| Tail + backup | Low red | White |
| Tail + brake + turn | Flashing high red/yellow | Flashing yellow/high red |
| Tail + brake + backup | High red | White |
| Tail + brake + turn + backup | Flashing high red/yellow | White |
| Tail + turn + backup | Flashing low red/yellow | White |
| Brake | High red | High red |
| Brake + turn | Flashing high red/yellow | Flashing yellow/high red |
| Brake + backup | High red | White |
| Brake + turn + backup | Flashing high red/yellow | White |
| Turn | Flashing yellow | Flashing yellow |

TABLE 4-continued

| Signal(s) | Lamp A | Lamp B |
|---|---|---|
| Turn + backup | Flashing yellow | White |
| Backup | White | White |

For the signaling modes in which a tail or brake light is illuminated together with the turn indicator, the operating mode in Table 4 shows "Flashing high (low) red/yellow" for lamp A and "Flashing yellow/high (low) red" for lamp B. This produces "out-of-phase" flashing in which lamp A is red when lamp B is yellow and vice versa. In some geographical regions, out-of-phase flashing at the rear of the vehicle may not meet relevant government regulations regarding vehicle signaling lights, but where it is allowed the out-of-phase flashing is expected to provide higher visibility. Advantageously, it is straightforward to use.

Additional features described with reference to the taillight assemblies 170, 172, such as color point adjustment on a geographical region basis or on another basis and/or inclusion of real-time adjustment based on sensor feedback, can also be incorporated into the color mixing light source or sources A, B.

With reference to FIG. 14, as yet another example left and right taillight assemblies 370, 372 each include three color mixing light sources J, K, L with the color mixing light source J being located outermost on the vehicle 150 and the color mixing light source L being located innermost on the vehicle 150. Table 5 provides a suitable set of operational modes for the various signaling modalities.

TABLE 5

| Signal(s) | Light source J | Light source K | Light source L |
|---|---|---|---|
| Tail | Low red | Low red | Low red |
| Tail + brake | High red | High red | High red |
| Tail + panic brake | High red | Flashing red/yellow | High red |
| Tail + turn | Flashing low red/low red/yellow | Flashing low red/yellow/low red | Flashing yellow/low red/low red |
| Tail + backup | Low red | Low red | White |
| Tail + brake + turn | Flashing high red/high red/yellow | Flashing high red/yellow/high red | Flashing yellow/high red/high red |
| Tail + brake + backup | High red | High red | White |
| Tail + brake + turn + backup | Flashing high red | Flashing high red | White |
| Tail + turn + backup | Flashing low red | Flashing low red | White |
| Brake | High red | High red | High red |
| Panic brake | High red | Flashing red/yellow | High red |
| Brake + turn | Flashing high red/high red/yellow | Flashing high red/yellow/high red | Flashing yellow/high red/high red |
| Brake + backup | High red | High red | White |
| Brake + turn + backup | Flashing high red | Flashing high red | White |
| Turn | Flashing off/off/yellow | Flashing off/yellow/off | Flashing yellow/off/off |
| Turn + backup | Flashing off/yellow | Flashing yellow/off | White |
| Backup | White | White | White |

For turn indicators (other than when backup is simultaneously being signaled), the out-of-phase operation described with reference to FIG. 13 is extended in the embodiment of FIG. 14 to define a "chaser" arrangement, in which the yellow light moves "outward" starting at the innermost color mixing light source L and then flashing to the middle color mixing light source K and finally to the outermost color mixing light source J.

In Table 5 panic braking is indicated by a combination of flashing high intensity red lights and a central flashing red/yellow light. If the jurisdiction does not permit yellow light output for rearward facing signal lights, then only flashing high intensity red lights can be employed. In another contemplated approach, the area of the red light is changed to indicate hard (i.e., panic) braking. For example, light source L may be unused (i.e., off) during normal operations (e.g., as a taillight or brake light, but still used to emit white light during backup). In this approach, the light source L is suitably operated to emit red light during panic braking so that the total area of red light emission is increased to indicate panic braking. In such embodiments, it may be useful to modify the light source L to be larger than shown in FIG. 14, so that the increase in area is more pronounced. In such embodiments the light source L may additionally be used to emit white light indicating backup.

With returning reference to FIGS. 9 and 10, it will be observed that the taillight assemblies 170, 172 have a 180° rotational symmetry. In other words, taking the left taillight assembly 170 and rotating it 180° makes the turn indicator arrow point to the right. As such, a single SKU line can be used for both left and right taillights 170, 172, with the taillight assembly of FIG. 10 mounted "upside down" and connected with the right turn indicator signal of the vehicle 150 to implement the right taillight assembly 172.

Figure 15:
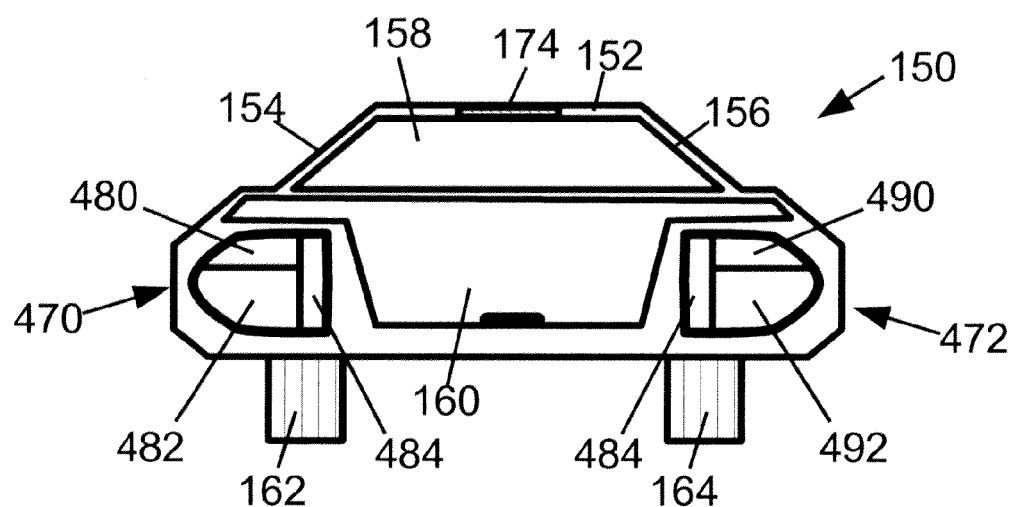
FIG. 15 diagrammatically shows a rear view of an automobile including functionally asymmetric left and right taillight assemblies.
Figure 16:
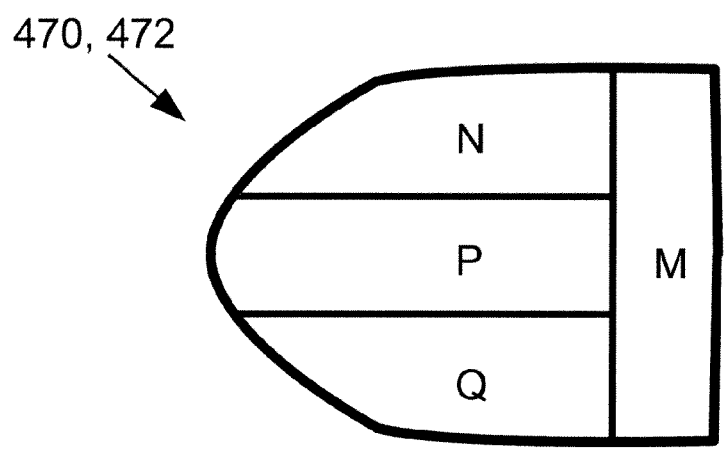
FIG. 16 diagrammatically shows a single SKU line taillight assembly that can function as either the left or right asymmetric taillight assembly of FIG. 15.

With reference to FIGS. 15 and 16, if the taillight assembly does not have 180° symmetry, it is conventionally not possible to use the same SKU line for both left and right taillights. However, by using color mixing light sources, this difficulty can be overcome if the physical extent of the taillight assembly has 180° rotational symmetry. Such an example is shown in FIG. 15, where a left taillight 470 and a right taillight 472 have 180° rotational symmetry respective to the entire illuminated taillight area, but the functionality of the light regions does not have this symmetry. The left taillight 470 has a turn indicator region 480 that is smaller in area than a tail/brake region 482, while an inner light region 484 serves as the backup light. The right taillight 472 has a turn indicator region 490 that is smaller in area than a tail/brake region 492, while an inner light region 494 serves as the backup light. The size asymmetry of light regions 480, 482 and 490, 492 breaks the 180° symmetry at the functional level. As shown in FIG. 16 and Table 6, however, a single SKU line can embody both left and right taillights 470, 472 by suitably representing the larger light region 480, 490 by two color mixing light sources, one of which is sized the same as the smaller light region 482, 492, and by suitably mapping the color mixing light sources to the functionality. Thus, the taillight assembly as shown in FIG. 16 includes color mixing light sources M, N, P, Q which are used differently when mounted in the left or right taillight positions, as detailed in Table 6.

TABLE 6

| Color mixing light source | Function in left taillight assembly | Function in right taillight assembly |
|---|---|---|
| M | Backup (white) | Backup (white) |
| N | Left indicator (yellow) | Tail/brake (red) |
| P | Tail/brake (red) | Tail/brake (red) |
| Q | Tail/brake (red) | Right indicator (yellow) |

As seen in Table 6, the color mixing light source P is red in both the left and right taillight positions, while the color mixing light source M is white in both the left and right taillight positions. Accordingly, the color mixing light sources M, P can optionally be replaced by another type of light source. For example, the color mixing light sources M, P can optionally be replaced by incandescent lamps, non-color mixing LED-based light sources, or so forth. However, the light sources N, Q are color mixing light sources, and are set to either red or yellow output depending on whether they are used in the left or right taillight positions, in accordance with Table 6. The selection of the left or right position can be made using a "left/right" switch (not shown) similar to the region switch 208 for the taillight assembly 270. Other ways of inputting the left/right configuration setting include loading this information into firmware using a suitable digital input such as a USB port, or including a strategically placed sensor on the taillight assembly housing that is activated when the taillight assembly is mounted on the left-hand side of the vehicle but not when the taillight assembly is mounted on the right-hand side of the vehicle (or vice-versa).

The taillight assembly can be constructed with various levels of modularity. If the taillight assembly including any associated optics is constructed as a single unit (for example, a single sealed unit to ensure weatherproof construction), then that unit will typically be designed for a single vehicle make/model.

Figure 17:
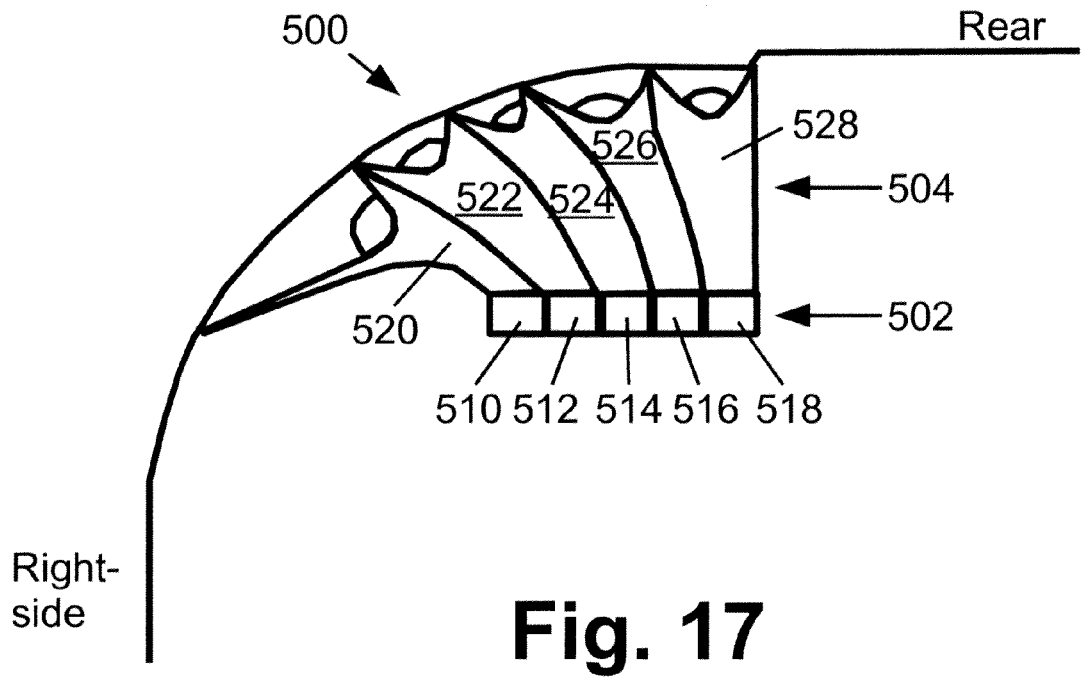
FIGS. 17 and 18 diagrammatically show a modular configuration in which the taillight assembly includes a color mixing light source array module optically coupled with different optical modules for different vehicle makes/models.
Figure 18:
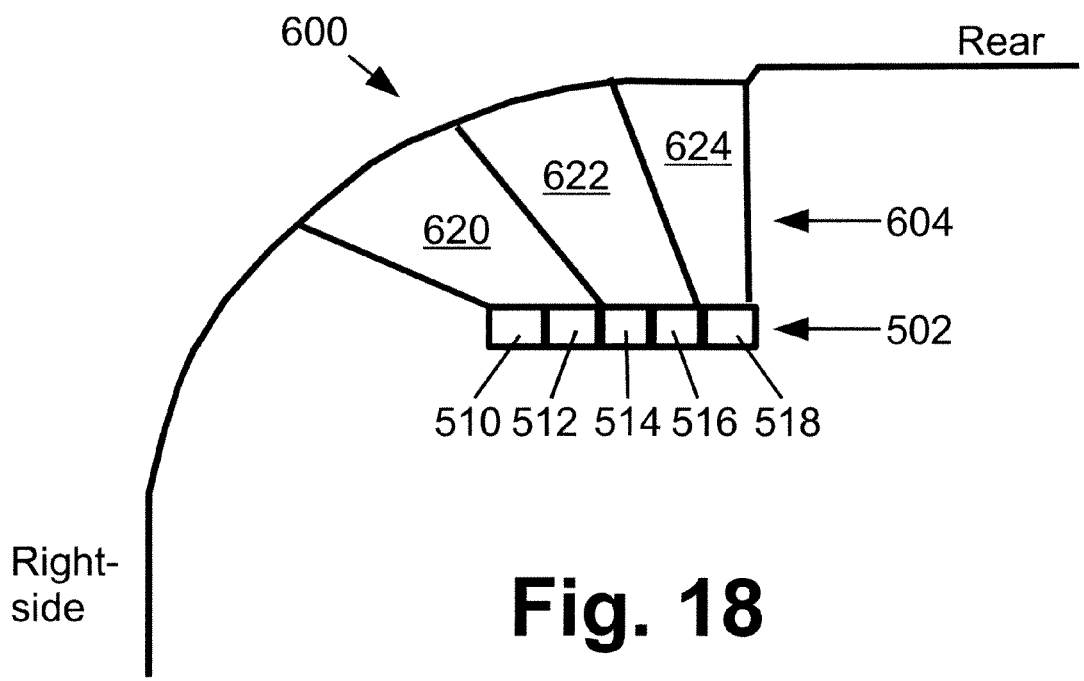

With reference to FIGS. 17 and 18, in other embodiments it is contemplated to construct the taillight assembly as a combination of components. FIGS. 17 and 18 show diagrammatic overhead views of the rear right corner of two different automobile models (that is, the rear "right" corner respective to the driver's vantage point). In these views, the rear of the vehicle is denoted "rear" and the right side of the vehicle is denoted "right-side". The vehicle of FIG. 17 includes a taillight assembly 500 comprising a color mixing light source array module 502 and an optical module 504. The illustrative color mixing light source array module 502 includes five light source elements 510, 512, 514, 516, 518. In the taillight assembly 500 of the vehicle of FIG. 17, these five light source elements are coupled into five respective optical paths 520, 522, 524, 526, 528 shaped to define five color-mixing signal lights facing generally rearward. The optical paths 520, 522, 524, 526, 528 include suitable refractive, reflective, dispersive, scattering, or other passive optical elements such as light guides, lenses, mirrors, or so forth, and are cosmetically shaped to blend in with and contribute to the aesthetics of the rear right corner of the vehicle. Thus, five color mixing light sources are defined: a color mixing light source 510, 520; a color mixing light source 512, 522; a color mixing light source 514, 524; a color mixing light source 516, 526; and a color mixing light source 518, 528. These five color mixing light sources are customized to the make/model of the vehicle of FIG. 17 based on the shaping or other configuration of the optical module 504. In similar fashion, FIG. 18 shows a vehicle of another make/model, which has a taillight assembly 600 comprising the same color mixing light source array module 502 shown in FIG. 17, but optically coupled with a different optical module 604 comprising only three optical paths 620, 622, 624. In this arrangement, the two color mixing light source elements 510, 512 are coupled with the optical path 620 to form a first color mixing light source. The two color mixing light source elements 514, 516 are coupled with the optical path 622 to form a second color mixing light source. The single color mixing light source element 518 is coupled with the optical path 624 to form a third color mixing light source. The color mixing light sources of the taillight assemblies 500, 600 of FIGS. 17 and 18 are used as already described. For example, in the embodiment of FIG. 18 the color mixing light source 510, 512, 620 can function equivalently to the light source J of the embodiment of FIG. 14, the color mixing light source 514, 516, 622 can function equivalently to the light source K of the embodiment of FIG. 14, and the color mixing light source 518, 624 can function equivalently to the light source L of the embodiment of FIG. 14, and the taillight assembly 600 is then suitably operated in accordance with Table 5 to implement various signaling functionality. Advantageously, in this modular configuration the color mixing light source array module 502 can be marketed under a single SKU that is installable in a variety of different vehicle makes/models. In such embodiments, the color mixing light source array module 502 includes the controller 200 (see FIG. 11) integrally included in or with the module 502 as a unitary assembly to independently and selectively drive the light source elements 510, 512, 514, 516, 518 to generate light of selected visually perceived colors. The electronic configuration memory 206 of the controller 200 is suitably programmed (e.g., manually or by an automatic mechanism) to comport with the make/model of vehicle into which the module 502 is installed. Moreover, it is contemplated for the color mixing light source array module 502 to be usable for other vehicle lighting purposes in conjunction with suitable optics modules, such as for vehicle interior lighting for convenience, safety, and/or ambience. In such embodiments, the color mixing light source array module 502 is preferably manufactured to standards (respective to parameters such as rated operating temperature range, rated water resistance, input voltage, color mixing controller configuration, and so forth) so as to be suitable for general vehicular use including but not necessarily limited to taillight applications.

The foregoing disclosure has utilized taillight assemblies as illustrative signal light assemblies. However, the disclosed vehicle signal light assemblies can also be used for other types of signal lights, such as the center taillight assembly 174, or for side signal lights, or for front turn indicator/parking light assemblies, or so forth. In some contemplated embodiments, the disclosed color mixing lighting module can also be used for implementing non-signaling lighting functions, like auxiliary lighting inside the car, dashboard lighting, ambient lighting, or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An apparatus comprising:
    a vehicle signal light assembly including:
        at least one color mixing light source;
        a support element configured to support the at least one color mixing light source on a vehicle as a signal light;
        a user-adjustable configuration setting stored in the vehicle signal light assembly; and
        a controller configured to selectively drive each color mixing light source to generate light of a selected visually perceived color based on a received control signal and the user-adjustable configuration setting stored in the vehicle signal light assembly.

2. The apparatus as set forth in claim 1, wherein each color mixing light source of the vehicle signal light assembly comprises a plurality of light emitting diodes (LEDs) of at least two constituent colors.

3. The apparatus as set forth in claim 1, wherein the controller is configured to operate each color mixing light source of the vehicle signal light assembly using time-domain multiplexing (TDM) to generate the light of the selected visually perceived color.

4. The apparatus as set forth in claim 1, wherein the vehicle signal light assembly includes a plurality of color mixing light sources and further includes:
 a single piece transparent or translucent cover disposed over all the color mixing light sources.

5. The apparatus as set forth in claim 1, wherein the vehicle signal light assembly further includes:
 at least one additional light source that is not a color mixing light source;
 wherein the controller is further configured to cause the at least one additional light source to generate light responsive to a received control signal.

6. The apparatus as set forth in claim 1, wherein the controller is configured to drive the at least one color mixing light source of the vehicle signal light assembly to emit visually perceived white light responsive to a backup signal.

7. The apparatus as set forth in claim 6, wherein the controller is further configured to drive at least one color mixing light source of the vehicle signal light assembly to emit visually perceived red light responsive to at least one of a taillight or brake signal.

8. The apparatus as set forth in claim 7, wherein the controller is further configured to drive at least one color mixing light source of the vehicle signal light assembly to emit visually perceived yellow light responsive to a turn signal.

9. The apparatus as set forth in claim 6, wherein the controller is further configured to drive at least one color mixing light source of the vehicle signal light assembly to emit visually perceived yellow light responsive to a turn signal.

10. The apparatus as set forth in claim 1, wherein the controller is configured to drive at least one color mixing light source of the vehicle signal light assembly to emit (i) visually perceived red light responsive to at least one of a taillight or brake signal and (ii) visually perceived yellow or amber light responsive to a turn signal.

11. The apparatus as set forth in claim 1, wherein the controller is configured to drive at least one color mixing light source of the vehicle signal light assembly to emit visually perceived red light with a color point adjustment selected by an adjustment input.

12. The apparatus as set forth in claim 1, wherein the controller drives each color mixing light source of the vehicle signal light assembly to generate light of the selected visually perceived color using one of (i) a constant d.c. current and (ii) a constant root-mean-square (rms) a.c. current.

13. The apparatus as set forth in claim 1, wherein the controller is configured to drive at least one color mixing light source of the vehicle signal light assembly to alternate between a visually perceived first color light and a visually perceived second color light different from the visually perceived first color light responsive to simultaneous first and second control signals respectively selecting the visually perceived first color light and the visually perceived second color light.

14. The apparatus as set forth in claim 1, wherein the user-adjustable configuration setting has user-adjustable first and second values and the visually perceived color is selected based on a received turn signal and the configuration setting stored in the vehicle signal light assembly, wherein the visually perceived color is selected to be red if the user-adjustable configuration setting stored in the vehicle signal light assembly has the first value and is selected to be yellow if the user-adjustable configuration setting stored in the vehicle signal light assembly has the second value.

15. The apparatus as set forth in claim 1, wherein the user-adjustable configuration setting is stored in the vehicle signal light assembly as one of (i) a mechanical switch setting and (ii) data stored in an electronic configuration memory.

16. The apparatus as set forth in claim 1, wherein the vehicle signal light assembly comprises a taillight assembly.

17. The apparatus as set forth in claim 1, further comprising:
 a vehicle;
 wherein the vehicle signal light assembly is supported by the support element on the vehicle and the controller is operatively connected with the vehicle to operate the vehicle signal light assembly based on a control signal received from the vehicle.

18. The apparatus as set forth in claim 1, wherein the at least one color mixing light source includes:
 a color mixing light source array module; and
 an optical module comprising a plurality of optical paths each coupled with one or more light source elements of the color mixing light source array module, the optical paths comprising passive optical elements.

19. The apparatus as set forth in claim 1, wherein the controller is further configured to selectively drive at least two of the color mixing light sources to generate light of the same selected visually perceived color based on a received control signal.

20. An apparatus comprising:
 a vehicle signal light assembly including:
  at least one color mixing light source;
  a support element configured to support the at least one color mixing light source on a vehicle as a signal light; and
  a controller configured to selectively drive each color mixing light source to generate light of a selected visually perceived color based on a received control signal, wherein the controller is configured to drive at least one color mixing light source of the vehicle signal light assembly to emit visually perceived red light with a color point adjustment selected by an adjustment input; and
 an environmental sensor generating the adjustment input.

21. The apparatus as set forth in claim 20, wherein the environmental sensor is selected from the group consisting of: a precipitation sensor, a humidity sensor, a visibility sensor, an altitude sensor, and an ambient light sensor.

22. An apparatus comprising:
 a vehicle signal light assembly including:
  at least one color mixing light source,
  a support element configured to support the at least one color mixing light source on a vehicle as a signal light, and
  a controller configured to selectively drive each color mixing light source to generate light of a selected visually perceived color based on a received control signal;
 wherein the controller is configured to selectively drive at least one color mixing light source of the vehicle signal light assembly to generate light of a selected visually perceived color with a color point adjusted based on a color point adjustment parameter.

23. The apparatus as set forth in claim 22, wherein the color point adjustment parameter is defined by a configuration setting of the controller.

24. The apparatus as set forth in claim 23, wherein the configuration setting of the controller selects a geographical region.

25. The apparatus as set forth in claim 22, wherein the color point adjustment parameter is defined by an environmental measurement signal received by the controller.

26. A system comprising:
a plurality of taillight optical modules for different vehicle make/models, wherein each taillight optical module includes a plurality of optical paths comprising passive optical elements; and
a color mixing light source array module comprising a plurality of light source elements and an electronic controller, the color mixing light source array module being interchangeably optically coupleable with any one taillight optical module of the plurality of taillight optical modules to inject light into the optical paths of the coupled taillight optical module, the electronic controller operating the light source elements to emit light of selected visually perceived colors into the optical paths of the coupled taillight optical module.

27. An apparatus comprising:
a vehicle signal light assembly including:
   at least one color mixing light source;
   a support element configured to support the at least one color mixing light source on a vehicle as a signal light; and
   a controller configured to selectively drive each color mixing light source to generate light of a selected visually perceived color based on a received control signal, wherein the controller is configured to drive at least one color mixing light source of the vehicle signal light assembly to emit visually perceived light of the selected visually perceived color with a color point adjustment selected by an adjustment input; and
an environmental sensor generating the adjustment input.

28. The apparatus as set forth in claim 27, wherein the environmental sensor is selected from the group consisting of: a precipitation sensor, a humidity sensor, a visibility sensor, an altitude sensor, and an ambient light sensor.

* * * * *